United States Patent Office 3,173,505
Patented Mar. 16, 1965

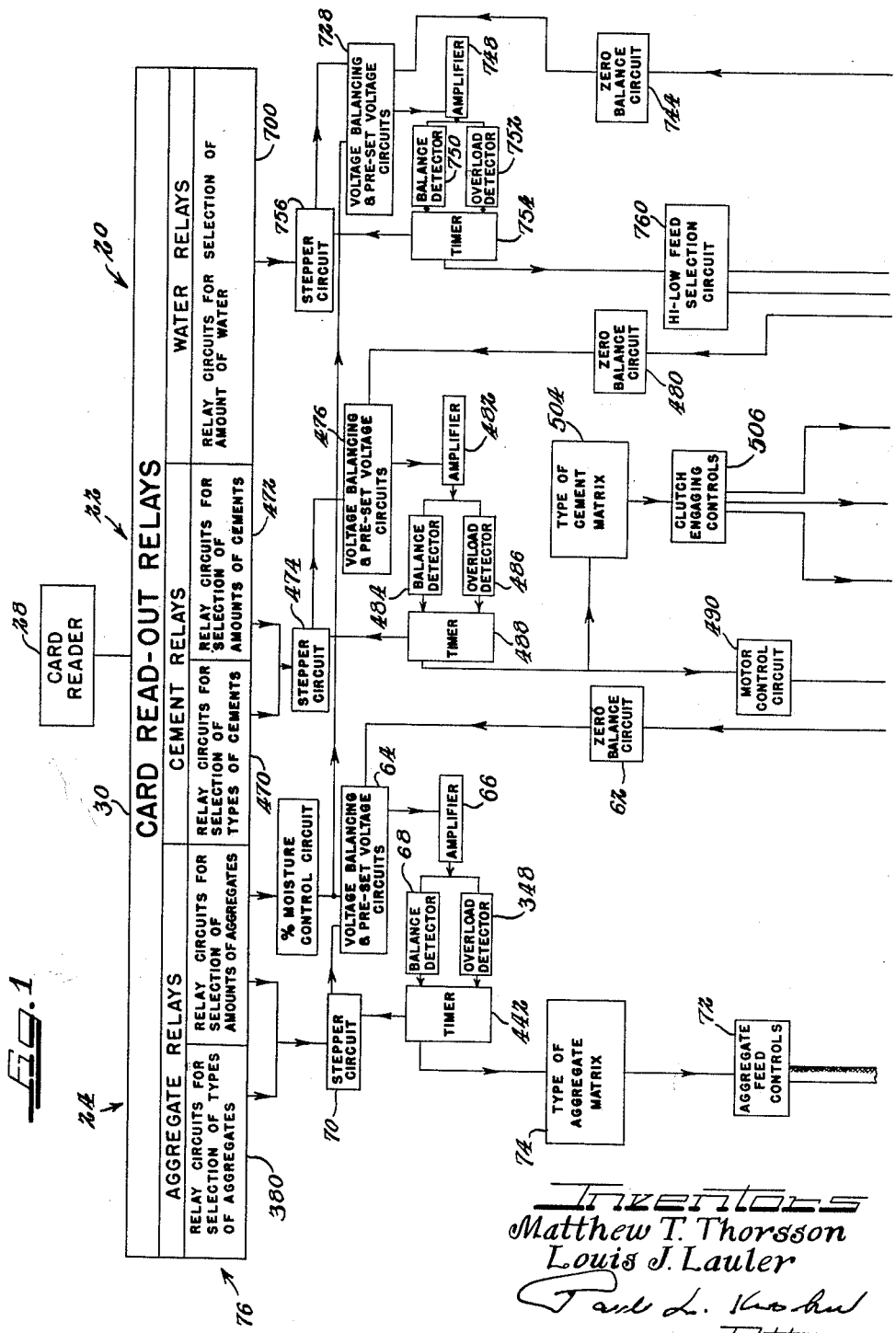

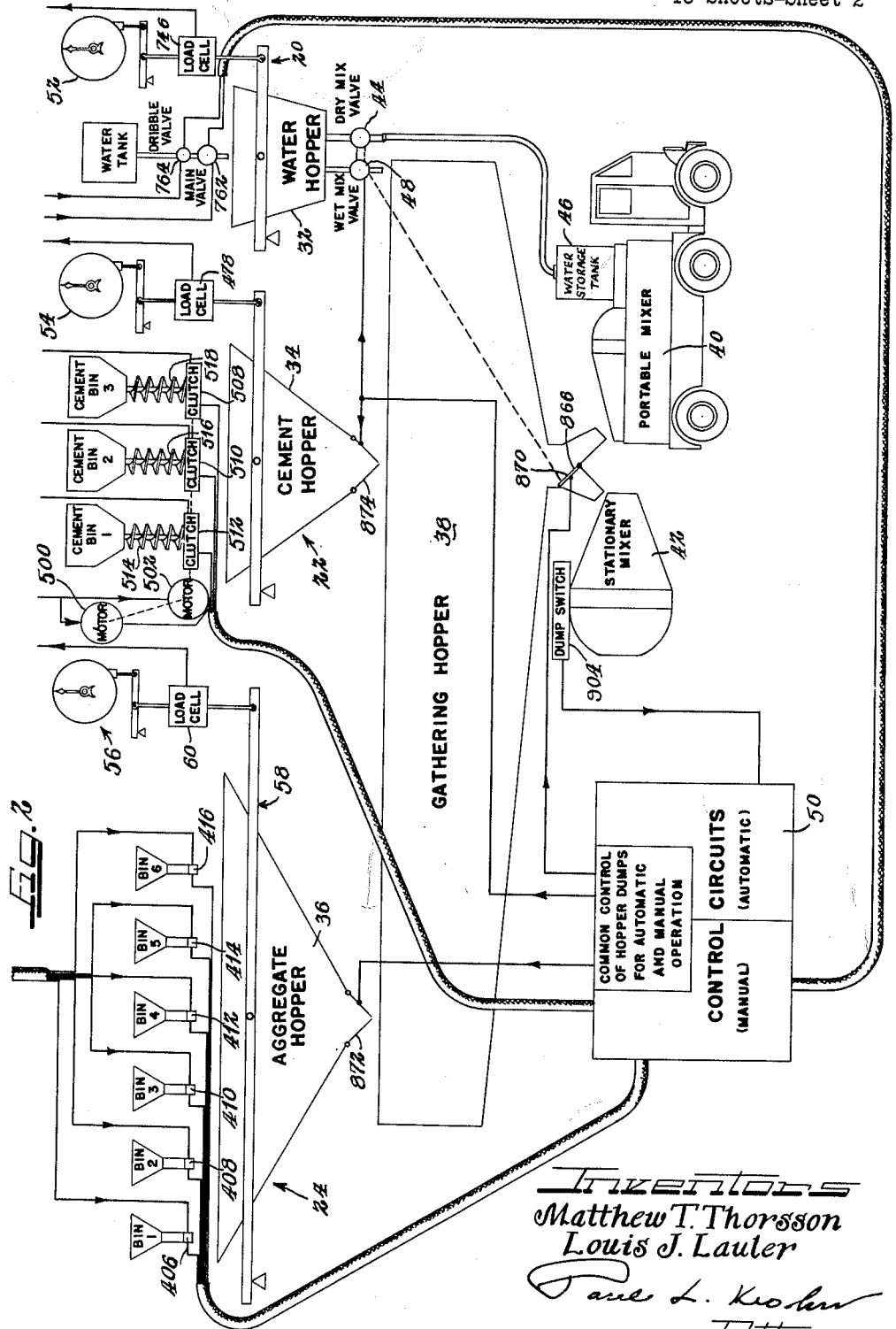

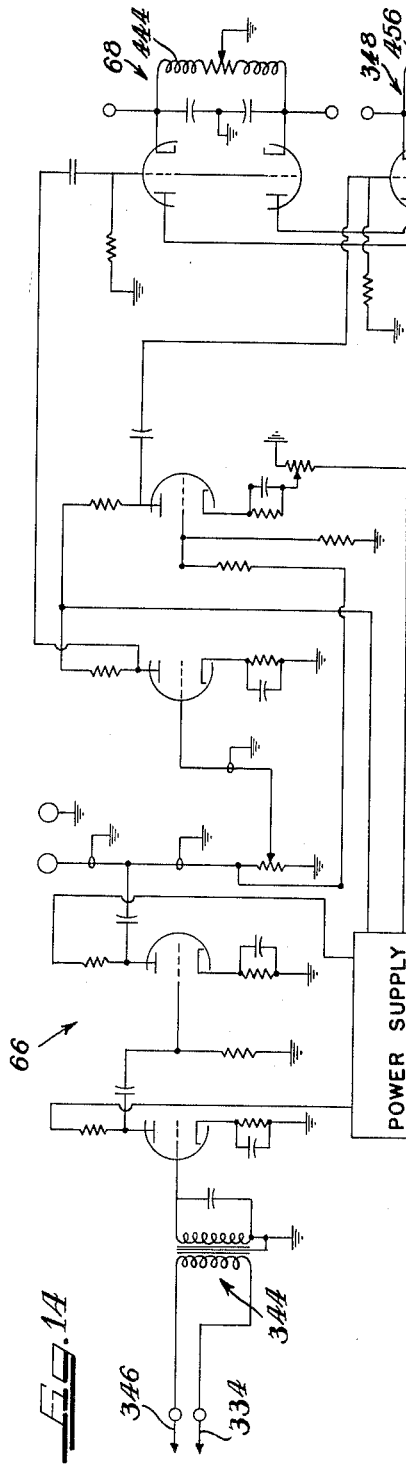

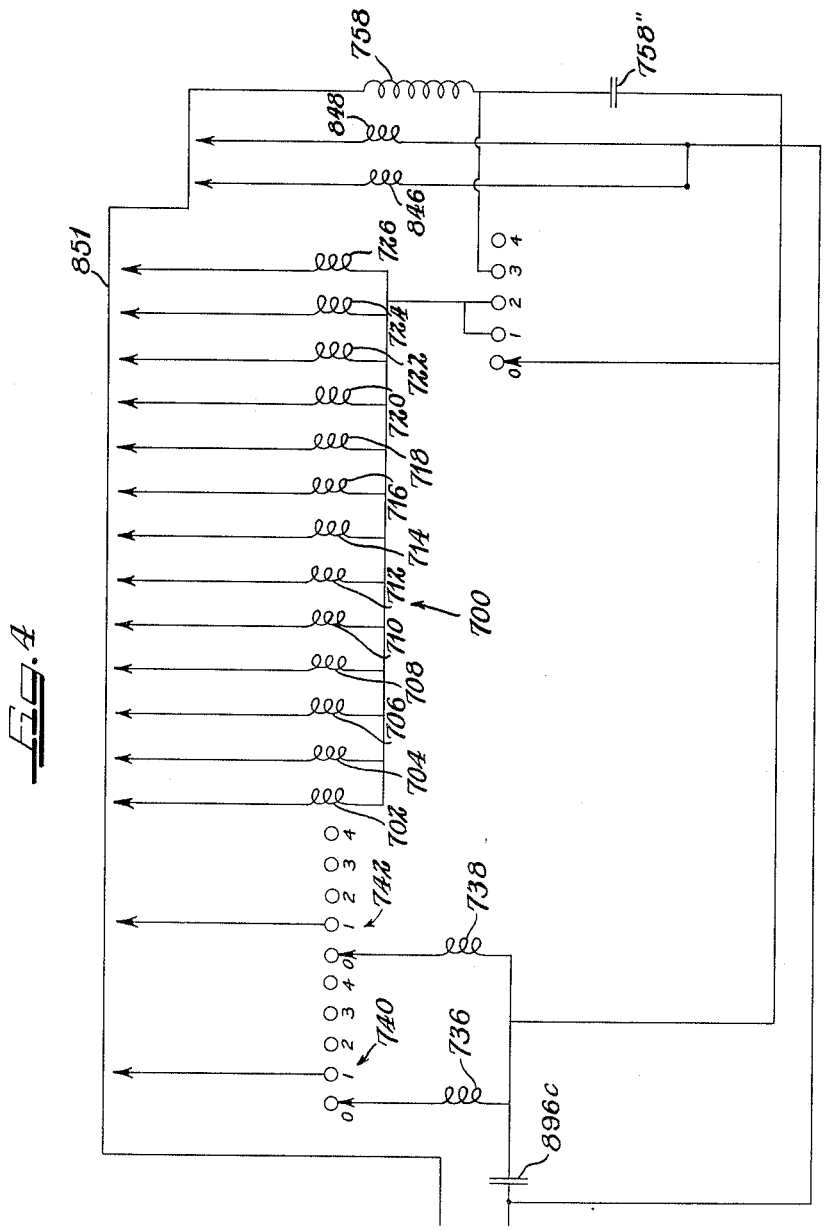

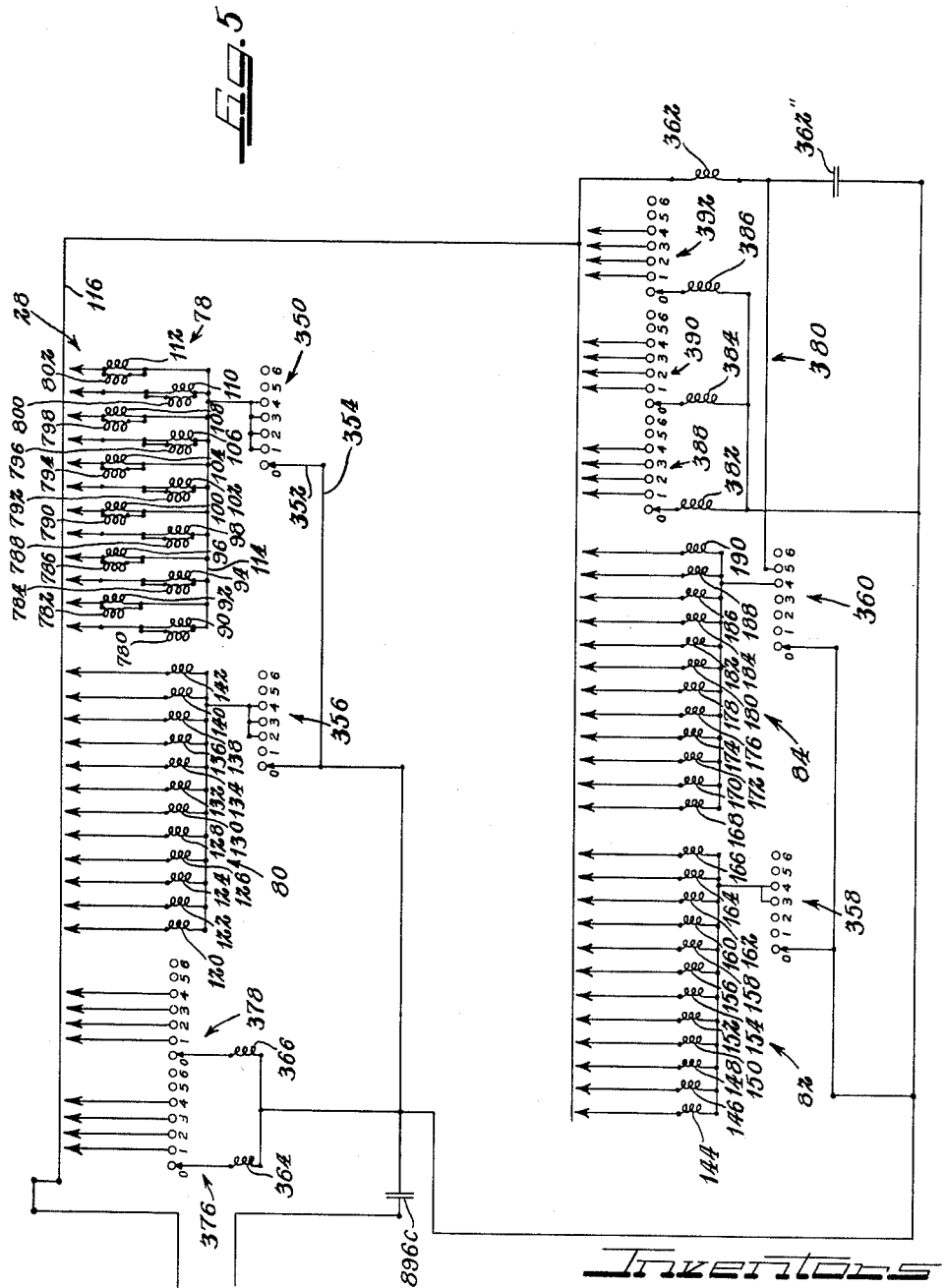

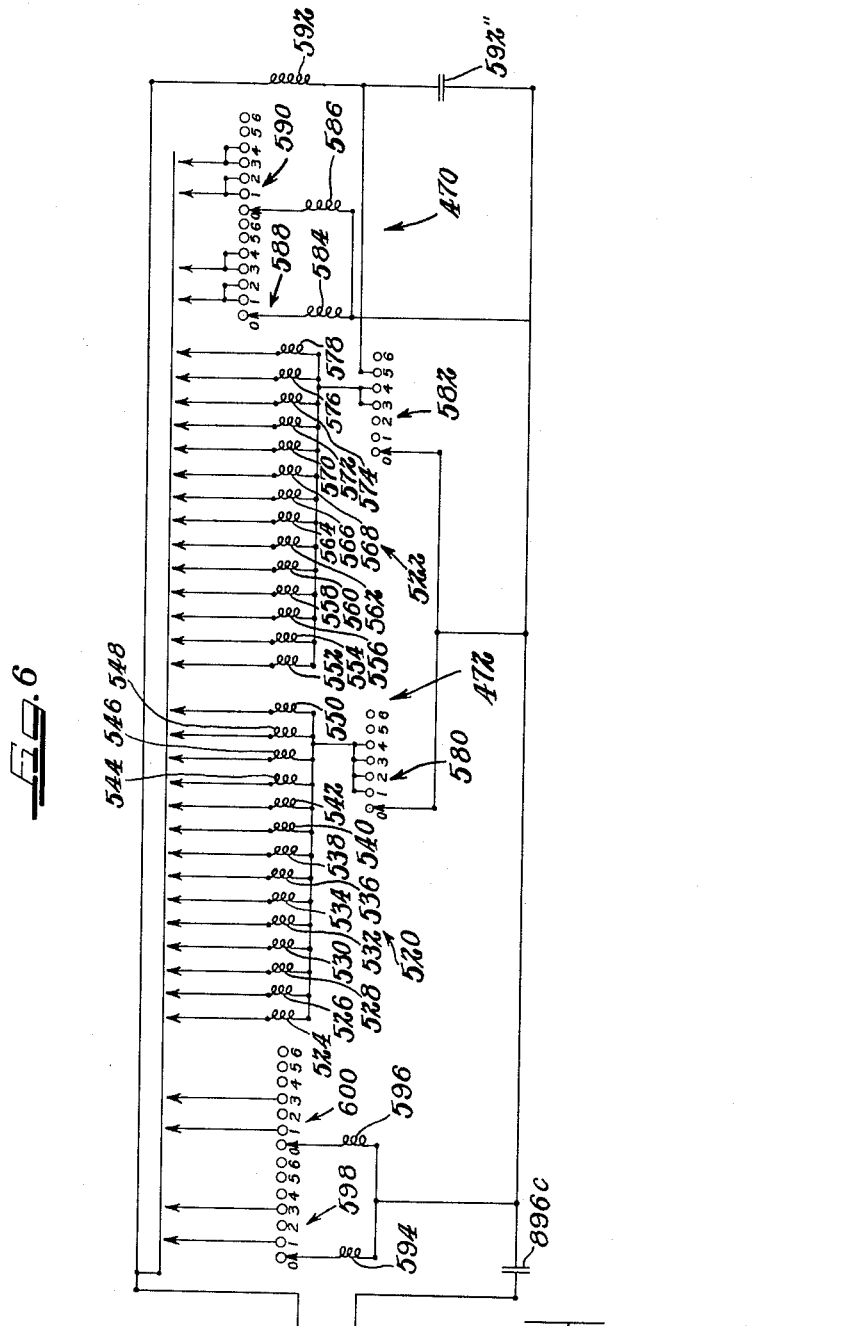

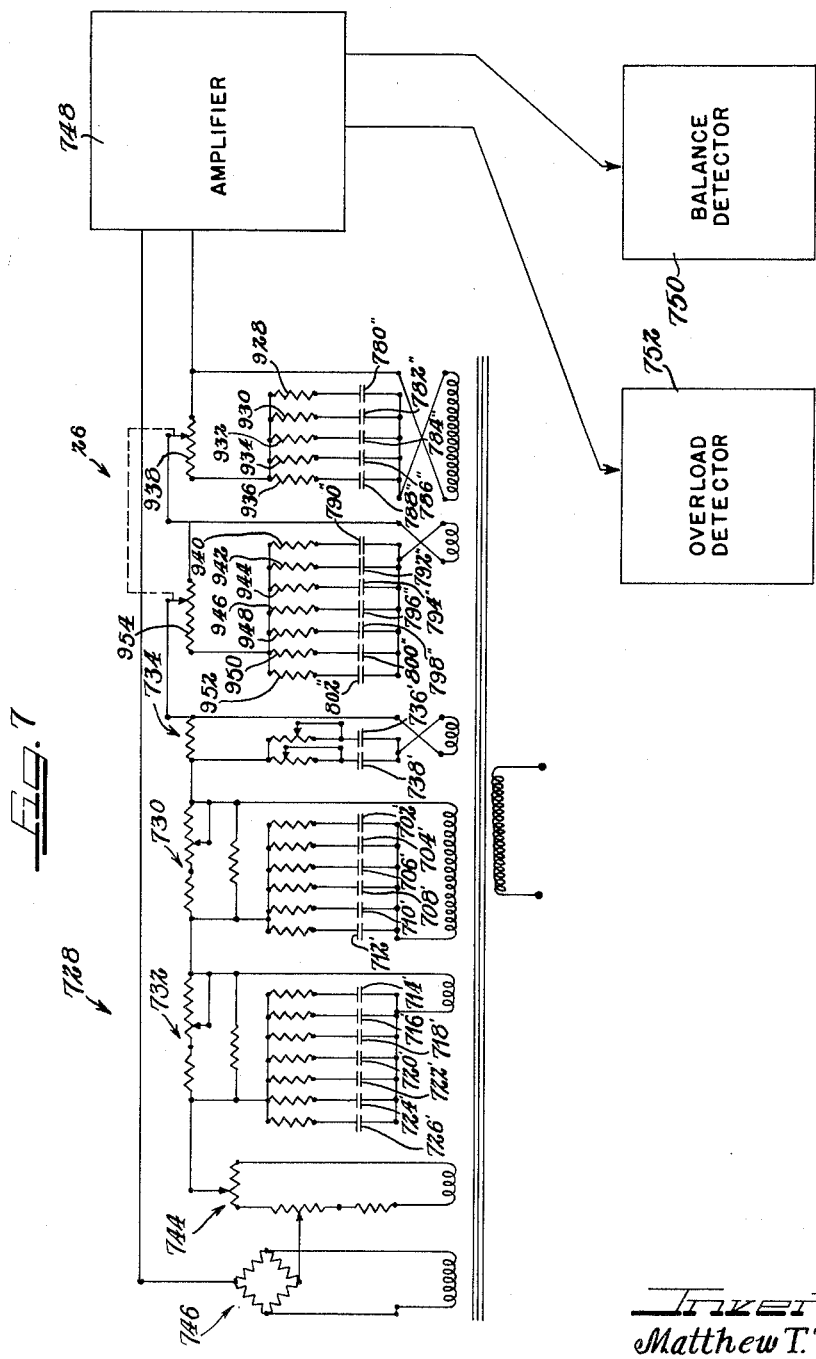

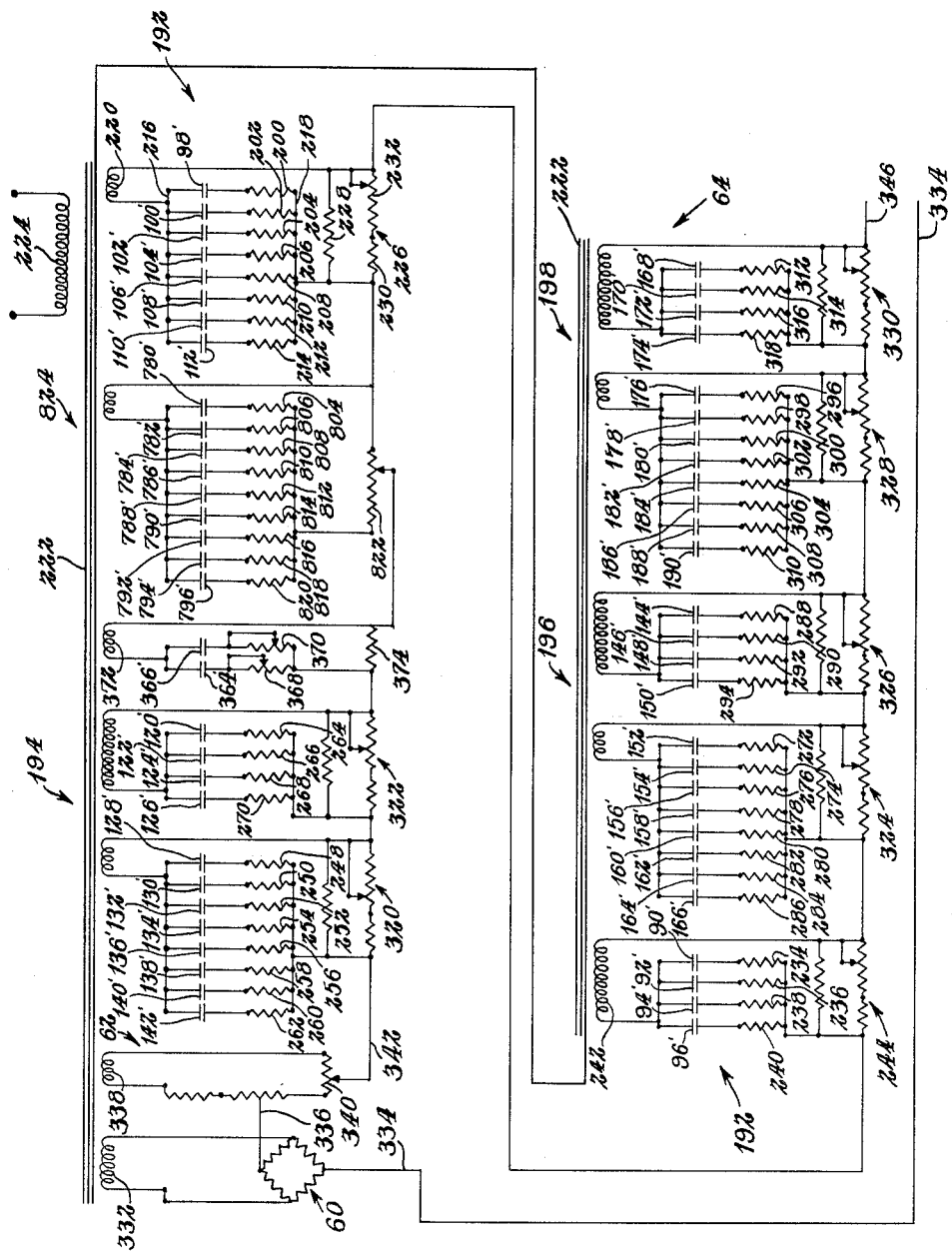

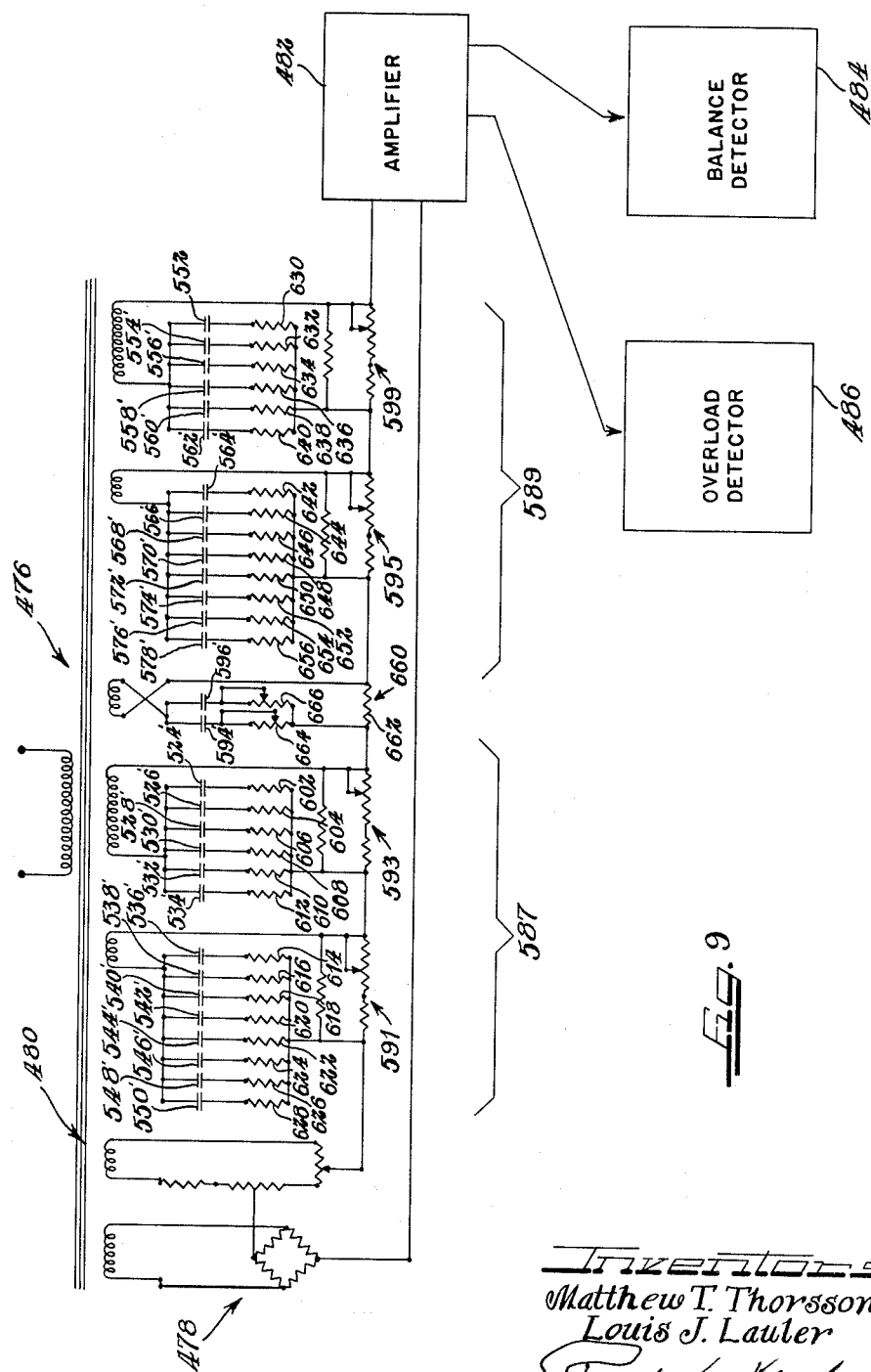

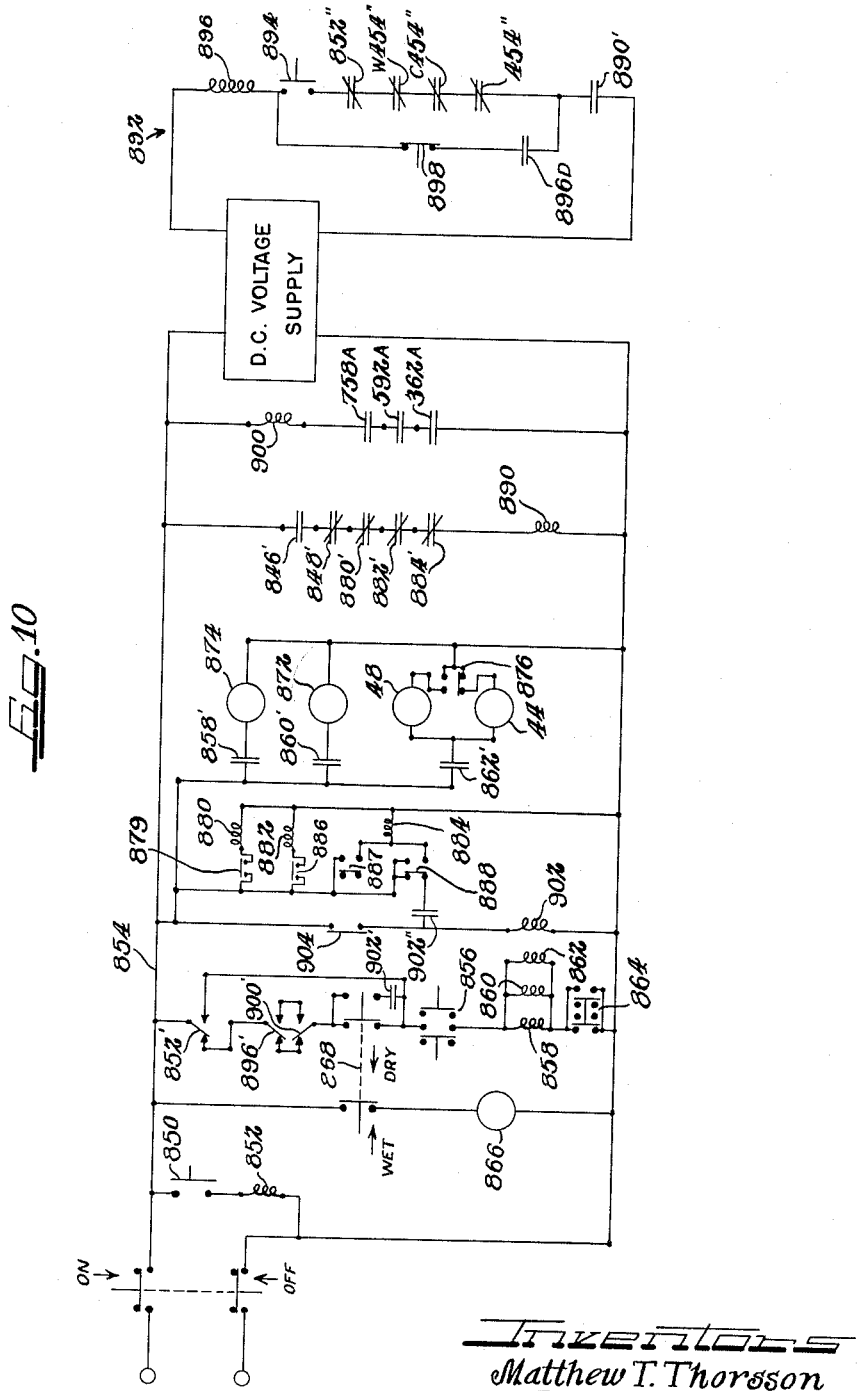

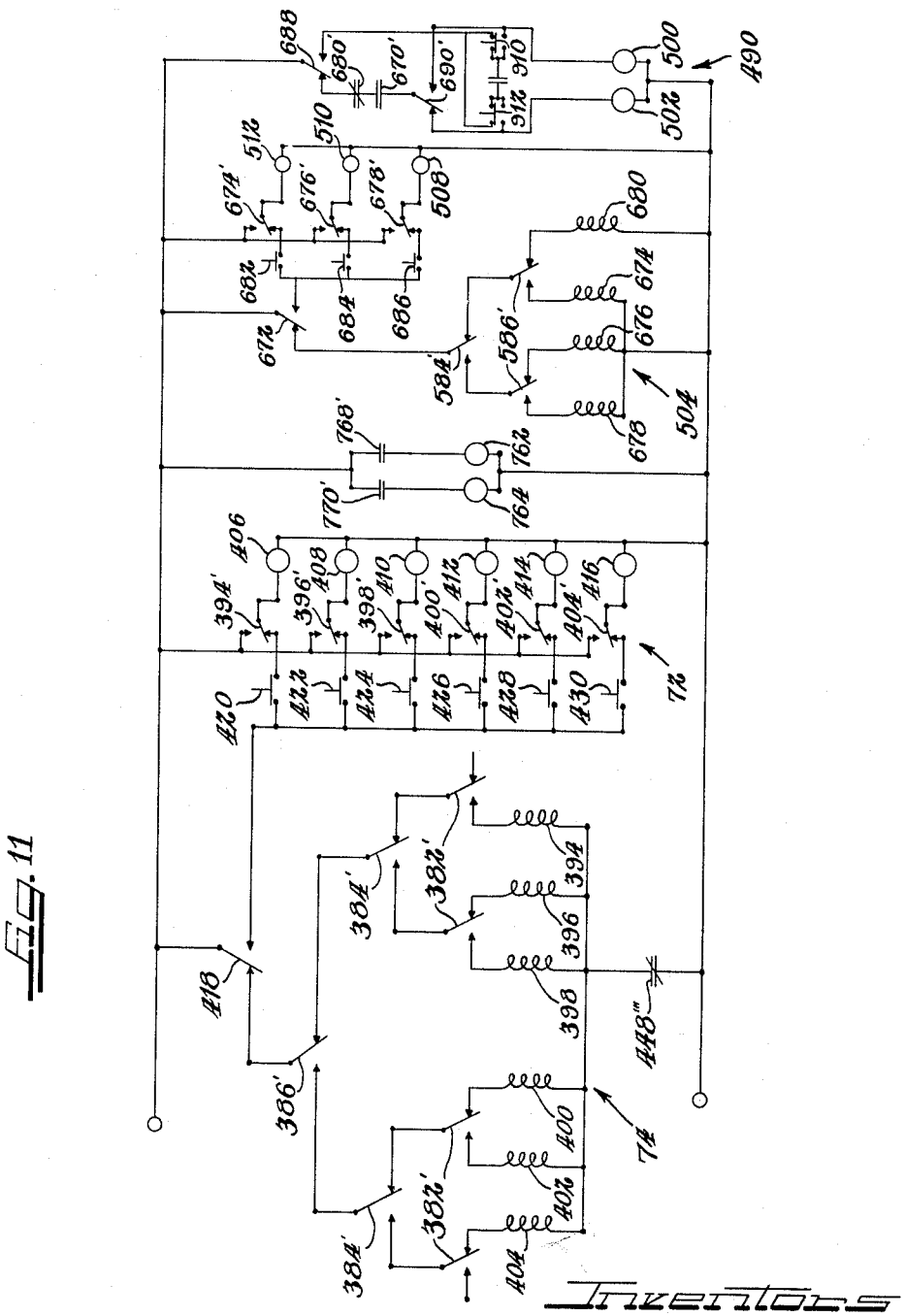

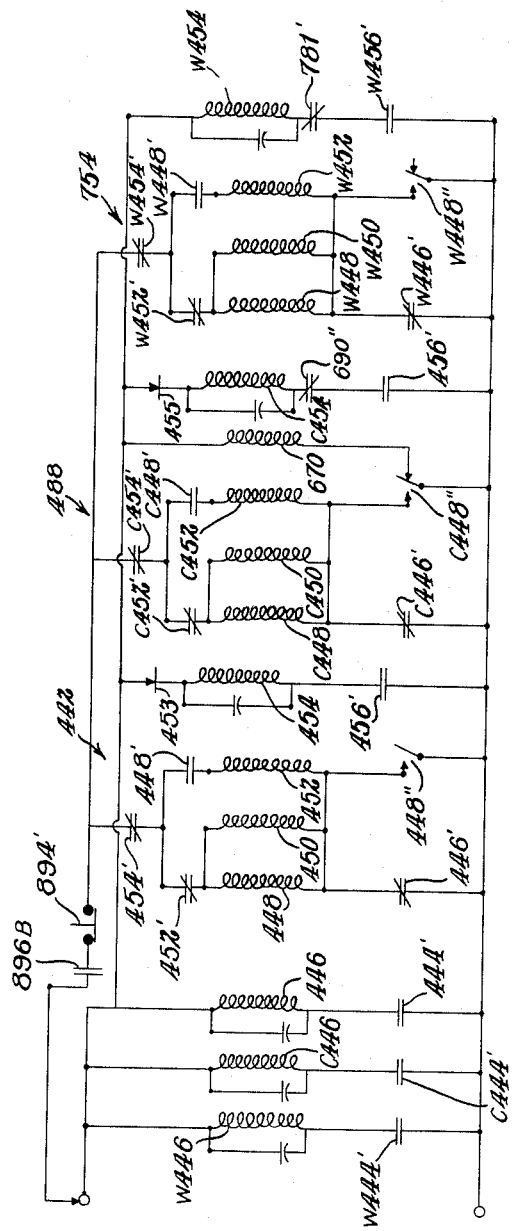

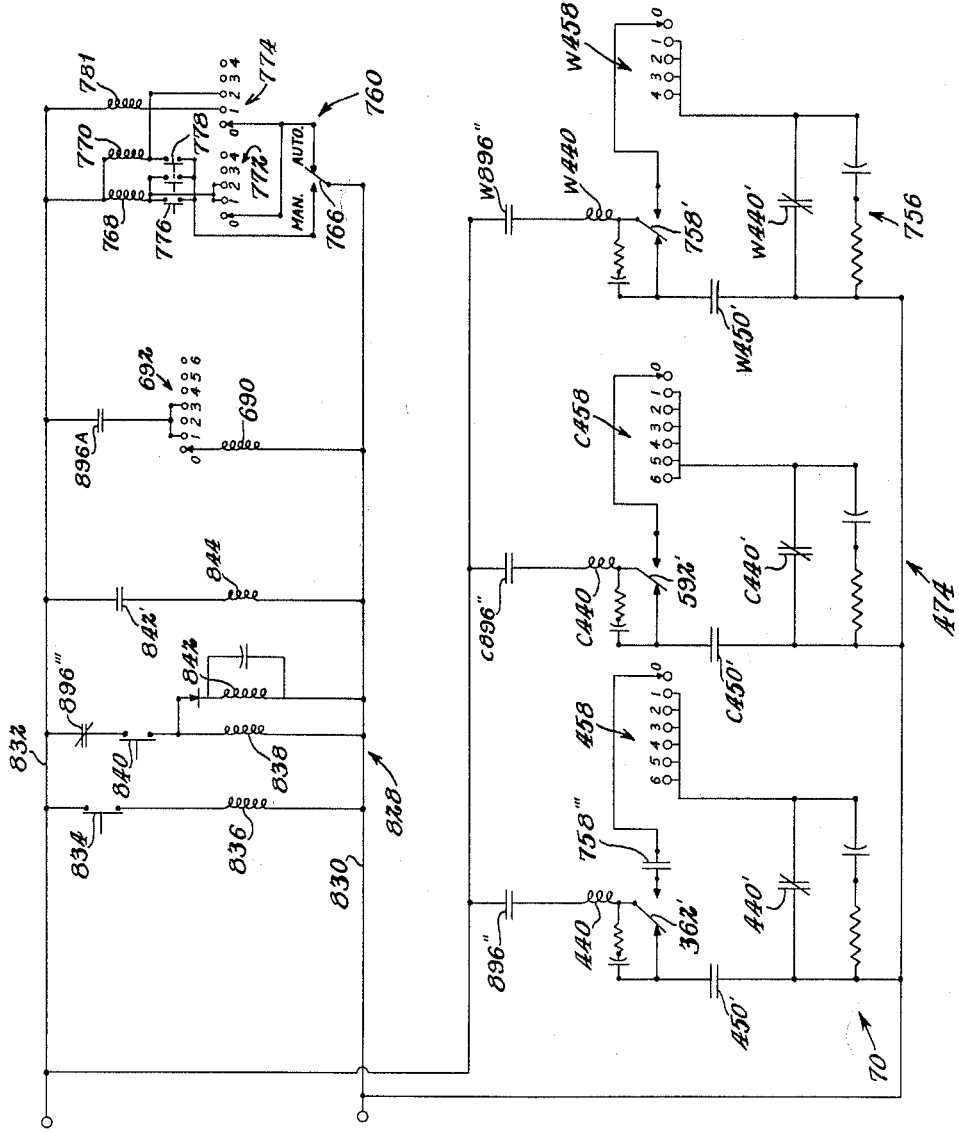

3,173,505
ELECTRICAL BATCHING SYSTEM
Matthew T. Thorsson, Moline, Ill., and Louis J. Lauler, Canoga Park, Calif., assignors, by mesne assignments, to Fairbanks Morse Inc., New York, N.Y., a corporation of Delaware
Filed Nov. 1, 1955, Ser. No. 544,169
20 Claims. (Cl. 177—70)

This invention relates to process control equipment and more particularly relates to an electrical batching system for a concrete batcher.

In batch weighing systems hereinbefore developed and particularly in various types of batchers, an operator has manually operated the equipment to produce each batch of ingredients. The contents of each batch by weight has been controlled by the operator as required. Frequently, errors occur in selecting the weight of one or more ingredients, and this is to be expected, when, for example, an operator may be called upon to deliver as many as 20 batches per hour with each batch differing as to contents and weight, as is the case in concrete batchers. Also in concrete batchers at least six different aggregates and three different cements may be required in the batch in varying amounts. Thus, a possibility of error exists by an improper selection of an ingredient by the operator.

In the concrete batcher of the present invention, the operation is controlled by a punched card, which is punched to indicate which aggregates and cements are required and how many pounds of each is to be present in the final batch. The card is used in a card reader which is arranged to energize card read-out relays of separate weighing systems for the aggregates, cements and water. The water weighing system, aggregate weighing system and cement weighing system are of similar construction, and all operate in the same general way.

Describing first the aggregate weighing system, the card readout relays for this system are energized by the card reader in accordance with which ingredients are selected and what amount of each is required. These relays condition voltage set-up circuits to produce a predetermined or pre-set voltage for each selected aggregate, which is proportional to the required weight of that aggregate. All of the aggregates are delivered into a weighing hopper. The hopper forms a part of a mechanical scale system, which has a dial to indicate the total weight in the hopper. A load cell is provided in the mechanical scale system so that the load cell is stressed in accordance with scale loading to produce a voltage proportional to the load in the hopper. The load cell is connected in series with the pre-set voltage circuits and with the input of an electronic amplifier. The voltages produced by the preset voltage circuits are in phase opposition to the load cell voltage, and the algebraic sum of these voltages is effective at the amplifier input.

A stepper or sequence circuit is provided, which includes stepping switches for rendering banks of card read-out relays effective, each bank representing an aggregate. The banks of relays are rendered effective one at a time in sequence, and the pre-set voltages for the selected ingredients are rendered effective one at a time. At the start of a weighing operation, the stepping switches activate the card read-out relays for the first selected aggregate to set up a pre-set voltage proportional to the required weight of this first aggregate. At this time no aggregate is in the weighing hopper and the effective load cell voltage will be zero, with the entire first pre-set voltage being effective at the amplifier input. The amplifier controls a balance detector, which through a timer circuit controls operation of the stepper circuit. The timer circuit also operates on an aggregate selection circuit or matrix in accordance with punched card information to open the feed gate for the first aggregate and cause the first aggregate to flow into the aggregate hopper.

As the first aggregate flows into the hopper the load cell voltage will increase until it equals the first opposing pre-set voltage, at which time the hopper load will be equal to the pre-determined weight punched into the control card for the first ingredient. When this condition prevails the input voltage to the amplifier will be zero. The balance detector senses this condition and in response thereto causes (via the timer circuit), the gate valve for the first aggregate to close. At the same time the balance detector causes the stepper circuit to operate and render a second bank of card relays operative as well as open the gate valve for the second selected aggregate. This second bank of relays causes the pre-set voltage circuit for the second aggregate to produce an opposing voltage proportional to the required weight of the second selected ingredient. This creates an unbalanced voltage condition between the two pre-set voltages and the load cell voltage. When enough of the second aggregate has fallen into the aggregate hopper so that a second balance of voltages occurs, the balance detector causes the second aggregate valve to close, the stepper circuit to render a third bank of read-out relays effective (for the third selected aggregate) and opens the gate valve for the third aggregate. Also, when required the fourth aggregate is fed in the same way.

An adjustable overload detector is provided to sense the amplifier output. If the load cell voltage should inadvertently exceed the opposing voltage, the overload detector is operated to stop the aggregate weighing system until the overload condition is corrected by removing some of the hopper load.

The control card, read-out relays and pre-set voltage circuits are arranged to utilize a novel numeral system based on a combination of the binary system and the decimal system, whereby the circuit arrangements are greatly simplified and yet the card is easily punched to represent a certain batch formula.

The cement weighing system is essentially identical to the aggregate weighing system as described above except that only three different cements are provided and the circuits are arranged to deliver any two of these in a given batch. Also provision is made for "dribble" approach to cut off the cement flow in the cement weighing system. The water weighing system is similar in principle to the others, but only one type of water is needed so that sequential feed is not present. However, a main and dribble feed is provided for the water system.

A common electrical control circuit for all thre weighing systems is provided, and this control system is characterized by having circuit arrangement to enable manual operation of the batcher or automatic operation. When a master switch is in the manual position the feed valves or controls for the aggregates, cements and water are prepared for push button operation. In manual batching the mechanical scales are observed to determine the batch contents. A manual "fast" and "dribble" feed control is provided for cement and water. In automatic operation the appropriate feed valves are opened in sequence as required by the card punching and the dribble feed is also automatically effected.

After a batch is weighed, the weighing hoppers are dumped into a gathering hopper and the contents passed to a stationary mixer if a wet mix is desired, i.e. if water is immediately mixed with the other ingredients. If a dry mix is required, interlocks cause only the dry ingredients to dump into the gathering hopper and the water is delivered into a tank on the portable mixer or truck. Safety circuits prevent dumping one batch on top of another in the stationary mixer and prevent starting weighing operation until the control card is properly placed in the reader and the discharge valves for the weighing hoppers are closed.

In the water and aggregate weighing systems provision is made to compensate for the moisture content of the sand. The actual amount of wet sand required is greater than the weight of dry sand expressed on the card, and the weight of the water delivered in the water system will have to be correspondingly reduced. Once the percent moisture is determined and circuit means adjusted, the compensation for moisture is automatically determined.

Accordingly an object of the invention is to provide a batch weigher with a plurality of weighing systems operable together to produce a batch.

Also an object is to provide a weighing system arranged to weigh certain ingredients from a group of ingredients.

Another object is to provide a batcher wherein card controlled automatic operation and push-button manual operation are both available to the operator.

A further object is to provide a batcher combining mechanical and electrical weighing systems, providing both manual and automatic operation.

A still further object is the provision of moisture compensation circuit means between water and aggregate weighing systems.

Another object is to provide an overload detector for an electrical weighing system and further provide an overload detector that is only operative in the dribble sequence of weighing operation.

A further object is to provide a card controlled batcher wherein both the ingredients and their weights are selected by card punching. These and other objects and advantages will become more readily apparent as the description proceeds and is read in conjunction with the attached drawings in which;

FIG. 1 is a block diagram, schematically showing a part of a concrete batcher.

FIG. 2 is a schematic diagram showing the rest of the batcher. It should be noted that FIGS. 1 and 2 are to be read together with FIG. 1 above FIG. 2 and with the lead wires aligned.

FIG. 3 shows the control card, which controls automatic operation of the batcher in accordance with ingredient selection and weight information punched therein.

FIG. 4 is an electrical diagram of the card read-out relay circuit of the water weighing system.

FIG. 5 shows the card read-out relay circuit for the aggregate weighing system.

FIG. 6 is the card read-out relay circuit for the cement weighing system.

FIG. 7 shows the voltage balancing and pre-set voltage circuits for the water weighing system.

FIG. 8 is an electrical diagram of the voltage balancing and pre-set voltage circuits for the aggregate weighing system.

FIG. 9 is the voltage balancing and pre-set voltage circuits for cement.

FIG. 10 is a schematic diagram of the electrical control circuit for the batcher.

FIG. 11 is a diagram of the water, aggregate and cement feed circuits and selection circuits for determining which cements and aggregates will be present in the batch.

FIG. 12 shows the timing circuits for the weighing systems.

FIG. 13 includes the stepper circuits for the weighing systems, the control circuit for the card reader and water valve control circuit; and FIG. 14 is a schematic diagram of the amplifier for the aggregate weighing system, including the balance detector and overload detector.

Introduction

The subject of this invention represents an extension of the teachings and concepts of our earlier filed, copending application, entitled, Card Operated Batcher, bearing Serial Number 534,134, filed September 13, 1955; by Matthew T. Thorsson and Louis J. Lauler, which application is hereby incorporated by reference.

In order to comply with statutory requirements that a specific embodiment of the invention be described, a complete concrete batcher is herein described, but it should be appreciated that the apparatus of the present invention is readily adapted for controlling other processes.

General layout of concrete batcher

In FIGS. 1 and 2, which are adapted to be read together, a schematic layout of the entire batching system is shown. In general the batcher comprises a water weighing system, indicated by reference numeral 20, a cement weighing system 22 shown in the center of these figures and an aggregate weighing system 24 shown on the left hand side of these figures. Each weighing system operates in essentially the same way, and all of them are controlled in automatic operation from the control card 26 shown in FIG. 3. The control card is used in card reader 28 shown at the top of FIG. 1, and causes, through card reader operation, energizations of card read out relays, indicated by box 30, in accordance with the information impressed on card 26.

The water, cements and aggregates are weighed into hoppers 32, 34 and 36 respectively, and these hoppers are arranged to discharge their contents into a gathering hopper 38. The gathering hopper is adapted to discharge the concrete batch into a portable mixer 40 or a stationary mixer 42. When the concrete is only to be hauled a short distance before it is used, the stationary mixer is used to mix together the aggregates, cements and water, and then the mixed batch is delivered to the portable mixer. If the concrete is to be hauled a long distance or not to be used for a long period of time, the aggregates and cements are delivered into the portable mixer, but the water is diverted by means of a "dry mix" valve 44 into a storage tank 46 on mixer 40. This enables the water to be added to the dry ingredients just before the concrete is to be used and the mixing is done in mixer 40. A wet mix valve 48 is provided to deliver the water to the gathering hopper when the batch is to be mixed in the stationary mixer.

A control circuit 50 is provided which affords complete operational control over the entire concrete batcher. The control circuit is arranged to provide completely automatic operation controlled by and operated from the control card.

The aggregate, cement and water weighing systems 20, 22 and 24 each include both an electrical weighing system and a mechanical dial scale. The dial scales for the water, cement and aggregate weighing systems are schematically shown respectively at 52, 54 and 56 (FIG. 2). These mechanical scales are provided so that the batcher can be operated semi-automatically. The control circuit 50 is provided with appropriate controls for the aggregate, cements and water feed gates or valves for feeding these materials to the weighing hoppers under manual push button control. Thus, the batcher can be operated by watching the dial scales and by pushing the proper buttons to feed the required ingredients, in their required amounts, to the weighing hoppers. This duality of control over operation of the batcher has proven exceptionally valuable and important, since it is very costly to shut down a complete batcher installation in case of a failure in the parts of the weighing systems which provide automatic operation.

In order to understood the operation of the batcher, the structure and operation of the aggregate, cement, and water weighing systems will be described in that order.

General arrangement of aggregate weighing system

Referring to FIGS. 1 and 2, it will be noted that aggregate hopper 36 is supported by weighing scale lever system, indicated at 58, and that this lever system includes a load cell 60.

The aggregates are delivered to hopper 36 from bins number from one through six, each bin having an electrically controlled gate valve as hereinafter described.

The load cell 60, which may be of the conventional bonded strain gauge type, is stressed in accordance with the load in hopper 36 to produce an output voltage that is proportional to the weight aggregates in the hopper. The load cell is connected to a zero balancing circuit 62, which is adapted to produce an adjustable voltage in phase opposition to the load cell voltage. Circuit 62 is adjusted to reduce the load cell voltage to zero when no weight is in the hopper.

In operation the load cell voltage produced by the dead load of the hopper is nullified so that the effective load cell voltage is proportional to the actual weight of aggregates in the hopper. The effective load cell voltage is fed to voltage balancing and preset voltage circuits, indicated at 64. Circuits 64 provide several voltages in phase opposition to the load cell voltage, one opposing voltage being supplied for each aggregate that is to be present in a batch and the magnitude of the opposing voltage being representative of the amount of that aggregate required.

Due to the circuit arrangement, the opposing voltage for the first aggregate will be the only opposing voltage that is initially effective and the discharge gate for that aggregate is the only gate capable of delivering material to hopper 36. Hence at the start of the batching cycle no material will be in the hopper, making the load cell voltage zero, and the opposing voltage for the number one aggregate will be effective. This produces a voltage unbalance, which is amplified by amplifier 36 and sensed by balance detector 68 to open the gate for that aggregate. Thus, the number one aggregate feeds into the hopper and as it reaches the hopper it causes the load cell voltage to increase. When the load cell voltage equals the number one opposing voltage a balance of voltages exists and in response thereto the balance detector 68, closes the gate on the delivering hopper. As schematically shown the aggregate feed controls, indicated at 72, are controlled through a selector circuit 74 that determines which of the aggregates are to be in the bath. As a practical matter only four of the six aggregates can be included in the batch for the batcher shown. Also upon reaching a voltage balance the stepper circuit 70 causes the gate on the next bin to open and the number two opposing voltage is rendered effective so that a second voltage unbalance prevails. Thus, the number two aggregate feeds until the load cell voltage equals the combined voltage value of the number one and number two opposing voltages, whereupon balance detector 68 causes the gate of the bin for the second aggregate to close, the gate on the bin for the third aggregate to open and the number three voltage to be effective. Similar operation follows if a fourth aggregate is to be included. As hereinafter explained any number of aggregates up to four can be selected and only the selected aggregates will be delivered to the hopper. For example aggregates number 1, 3, 5 and 6 could be batched or any combination of four of six aggregates.

As previously mentioned, the magnitude of each pre-set opposing voltage must be equal to the load cell voltage produced when the desired weight of material is in the hopper. Thus if 100 lbs. of number one aggregate are required, the number one opposing voltage is set up equal to the load cell voltage produced by 100 lbs. in the hopper. The other voltages are selected similarly.

The selection of opposing voltage magnitudes, which in turn determines the weight of each aggregate, is controlled from a card reader 28. As it will later appear all of the weight information for the batch of concrete is punched into the card and when it is placed in the card reader, the latter actuates banks of card readout relays one bank for producing each of the pre-set opposing voltages. These banks of read-out relays for the aggregate weighing system are generally indicated by number 76 in FIG. 1 and are rendered effective one at a time by stepper circuit 70 to provide sequential control of the pre-set voltages.

Control card arrangement

The control card, card read-out relays and pre-set voltage circuits are adapted to utilize what we have chosen to call a binary coded decimal system of numerical values. The binary system of numbers, which is well known in mathematics, is based on the fact that any whole number can be written by adding together the numbers produced by raising two to the various powers. Listed below is a partial table of numbers produced by raising two to all powers up to 9.

$2^0 = 1$     $2^5 = 32$
$2^1 = 2$     $2^6 = 64$
$2^2 = 4$     $2^7 = 128$
$2^3 = 8$     $2^8 = 256$
$2^4 = 16$    $2^9 = 512$

It will be seen that the numbers 1 through 15 can be written as follows:

$1 = 2^0$
$2 = 2^1$
$3 = 2^1 + 2^0 = 2 + 1$
$4 = 2^2$
$5 = 2^2 + 2^0 = 4 + 1$
$6 = 2^2 + 2^1 = 4 + 2$
$7 = 2^2 + 2^1 + 2^0 = 4 + 2 + 1$
$8 = 2^3$
$9 = 2^3 + 2^0 = 8 + 1$
$10 = 2^3 + 2^1 = 8 + 2$
$11 = 2^3 + 2^1 + 2^0 = 8 + 2 + 1$
$12 = 2^3 + 2^2 = 8 + 4$
$13 = 2^3 + 2^2 + 2^0 = 8 + 4 + 1$
$14 = 2^3 + 2^2 + 2^1 = 8 + 4 + 2$
$15 = 2^3 + 2^2 + 2^1 + 2^0 = 8 + 4 + 2 + 1$

When it is desired to electrically express a number, the binary system is far simpler to use than the decimal system. For example in order to produce a practical system where voltages are created to represent all digits up to 15, when decimal voltages are used 15 separate voltages would be required. When binary numbers are used only 4 voltages are required ($2^0$, $2^1$, $2^2$, $2^3$). For larger numbers than 15, the number of binary voltages required is proportionally smaller than decimal voltages.

The principal drawback to the use of binary number notation is the fact that it is unfamiliar and difficult for the average person to read or interpret numbers expressed in binary terms. With the binary coded decimal, system now to be described, the difficulty in interpretation is overcome while at the same time circuit simplifications are possible due to use of binary numbers. More specifically, the binary coded decimal system permits an unskilled operator to punch the card with binary coded decimal weight information, and the system also greatly simplifies the card reading circuits and pre-set voltage producing circuits operated from the card reader.

By the term binary coded decimal system, it is meant that decimal denominations are used (that is thousands, hundreds, tens and units, etc.) but in each denomination binary number notation is used. Thus in the units denomination the binary numbers 1, 2, 4 and 8 are used to express any number of units, and the unit numbers 1, 2, 3, 4, 5, 6, 7, 8 and 9 are represented respectively by binary combinations, 1, 2, 2+1, 4, 4+1, 4+2, 4+2+1, 8, 8+1. Exactly the same relationship applies in the tens denomination, except that the binary numbers 10, 20, 40 and 80 are used. In the hundreds denominations, binary numbers 100, 200, 400 and 800 are used, while in the thousands denomination numbers 1000, 2000, 4000 and 8000 are used. Hence, the decimal number 3970 would be represented by using binary numbers 1000 and 2000 in the thousands place, binary numbers 800+100 in the hundreds place, binary numbers 40+20+10 in the tens place, and zero in the units place.

In order to illustrate how the binary coded decimal system makes it simple to punch weight information onto the control cards, attention is invited to FIG. 3 of the drawings, which shows control card 26. The batcher of the present application is adapted to use two kinds of cements, four aggregates and one type of water, and thus seven horizontal rows of numbers are provided, one for each possible ingredient. These horizontal rows are divided into thousands, hundreds, tens, and units columns, as indicated. In the batcher herein illustrated the required cement weight will never exceed 8000 lbs., so only the 4, 2 and 1 are provided in the thousands column. Likewise no more than 4000 lbs. of water will be required so that the numbers 2 and 1 are the only numbers provided in the thousands column. In the hundreds and tens columns it will be noted that binary numbers 8, 4, 2 and 1 are provided in each horizontal row. Binary numbers 8, 4, and 2 are provided in the units column, for the water and cement, since only these ingredients need to be weighed accurately to the nearest two pounds. In other words it is only necessary to weight the aggregates to the nearest ten pounds.

As previously mentioned in the illustrated embodiment a total of six different aggregates and three different cements are available for mixing, but only four different aggregates and two different cements can be mixed together in any given bath. This possible mixing of four aggregates and two cements is sufficient to accommodate almost all practical mixtures that would be required. The left-hand column of the card is used to select the particular cements and aggregates to be present in the batch.

Assume by way of example (and this example will be used throughout this specification) that a concrete batch is to be produced having 1000 lbs. of cement #1, 540 lbs. of the cement #3, 4650 lbs. of aggregate #1, 2630 lbs. of aggregate #2, 1870 lbs. of aggregate #5, 2330 lbs. of aggregate #6, and 752 lbs. of water. Each number on card 26 that is circled would be punched out to prepare the card for operation in the batcher. To designate that cement #1 is required the 1 punched out of the first row in the type column and to designate that cement #3 is required the 1 and 2 are punched out of the second row. Thus for 1,000 lbs. of cement #1, the 1 is punched out in the thousands columns and nothing is punched out in the hundreds, tens and units columns of the first row. The second horizontal row is punched with a weight of 540 lbs. by punching the 4 and 1 in the hundreds columns and the 4 in the tens column. Aggregate #1 is to be present in the final batch to an extent of 4650 lbs. and the numbers in the third row are circled to represent this. No numbers are found in the units column for the aggregates, since the weighing system illustrated herein need not weigh the aggregates with an accuracy of greater than ten pounds. The remainder of the rows in the aggregate section are marked to designate 2630 lbs. of aggregate #2, 1870 lbs. of aggregate #5 and 2330 lbs. of aggregate #6. The water section is marked to indicate 752 lbs. and since there is only one type needed for water no selection is provided in the type column.

At the right hand end of card 26 a column is provided which in the case of the aggregate system is used to determine just when the aggregate feed should be cut off, and in the case of the cement and water system is punched to determine how many pounds of each is to be delivered at a slow dribble rate. If the aggregate feed were not stopped before the exact required weight was in the hopper, the suspended material would enter the hopper and make the actual weight greater than required. In order to speed the weighing operation and still have the weighing systems accurately weigh the ingredients in the cement and water systems it is advisable to feed most of each ingredient at a fast rate and then reduce the rate of feed for the last few pounds to prevent "overshooting" of the desired weight. The number of pounds of each ingredient to be delivered at the dribble rate to insure accurate weighing and termination of the aggregate feed are preferable determined experimentally and then the card is appropriately punched. By providing numbers 1 and 2 in the dribble column four combinations are possible; the 1 can be punched, the 2 can be punched, and the 1 and 2 can be punched, and neither can be punched on the card. All of these combinations have been indicated.

*Construction of aggregate weighing system*

After the weight information has been punched into the card to determine the batch formula, the card is inserted in card reader 28 (of FIG. 1), which operates the card read out relays, indicated at 30 in FIG. 1. The card reader and read out relays 76 for the aggregate weighing system are schematically shown on FIG. 5. The card read out relays are divided into four banks of relays, one for each of the four selected aggregates that can be used in a batch. Each bank contains 12 relays. The bank, generally indicated by numeral 78 (upper right corner), is for the first selected aggregate, while banks of relays 80, 82 and 84 are for the second, third and fourth selected aggregates, respectively. Considering first relay bank 78, it will be seen that the twelve relay coils are numbered 90, 92, 94, 96, 98, 100, 102, 104, 106, 108, 110 and 112. The lower ends of these relay coils are connected together by lead 114, and this lead is connected to certain of the fixed contacts of a rotary switch as hereinafter described. The upper end of each relay coil is connected to a movable contact of the card reader 28. These movable contacts in the inoperative condition of the card reader are spaced from a voltage supply lead or strip 116. The control card 26 is adapted to be inserted between the strip 116 and the movable contacts. It should be appreciated that when the card is properly positioned in the card reader the top horizontal row of numbers on card 26 in the aggregate section of the card aligned with these contacts, but each of the 12 movable contacts is centered on one of the twelve numbers that make up the top horizontal row in the aggregate section. Thus the contacts connected to relays 90, 92, 94 and 96 are centered over the 8, 4, 2 and 1 numbers in the thousands column. The other movable contacts are similarly aligned with the numbers in the hundreds and tens columns of the first row in the aggregate section.

With the card in place and when the card reader is actuated (hereinafter explained) the movable contacts will be moved toward conductor strip 116. The numbers that have been punched out of the top row on the card in the aggregate section will allow the associated movable contact to pass through the card and touch strip 116. If the number has not been punched from the card the associated contact is prevented from engaging strip 116. All movable contacts that do engage strip 116 will prepare the associated relay coil for energization. Using the example weight for aggregate #1 (indicated by circling the numbers on card 26, FIG. 3, which would be punched out to represent 4650 lbs.), it will be seen that relay 94 will be energized, since the 4 is punched out of the thousands column, relays 100 and 102 will be energized to represent the 6 in the hundreds place, and relays 108 and 112 will be energized to show that the 4 and 1 in the tens place are punched out. In relay bank 80, which is for the second selected aggregate, the relays are similarly connected. Relay coils 120, 122, 124, 126, 128, 130, 132, 134, 136, 138, 140 and 142 have movable contacts that are centered respectively over numbers 8, 4, 2 and 1 in the thousands column, 8, 4, 2 and 1 in the hundreds column and 8, 4, 2 and 1 in the tens column all in the second horizontal row of the aggregate section, when the control card is properly positioned in the card reader. Thus, to use the example of 2630 lbs. of aggregate #2, relay coils 124, 130, 132, 140, and 142 will be energized in relay bank 80 when the card reader is operated. Relay banks 82 and 84 are arranged identically to banks 78 and 80, and the relay coils in banks 82 and 84 are indicated by all the even numbers from 144 through 190. When the example weight of 1870 lbs. is used for aggregate #5, relay coils 150, 152, 162, 164 and 166 will be energized upon card reader operation. For a weight of 2330 lbs. of aggregate #6, relay coils 172, 180, 182, 188 and 190 will be energized.

The contacts for the several card read-out relays are arranged in the aggregate voltage balancing and pre-set voltage circuits 64 (FIG. 1). A schematic diagram of these circuits is shown in FIG. 8. There are four separate pre-set voltage circuits, one for each of the four aggregates that can be present in a batch. The pre-set voltage circuits for the first selected aggregate is generally indicated at 192 in FIG. 8 (the pre-set circuit being divided between the upper and lower halves of the figure), while the second, third and fourth selected aggregate pre-set voltage circuits are indicated by numbers 194, 196, and 198, respectively. Referring to FIG. 8 and to the first selected aggregate pre-set voltage circuit 192, it should be noted that the relay contacts of relay bank 78 are indicated in circuit 192 by adding a prime to the relay number. Likewise the relay contacts relay banks 80, 82, and 84 are arranged in pre-set voltage circuits 194, 196 and 198, and the contacts are designated by adding a prime to the operating relay indicating number.

Considering first aggregate pre-set voltage circuit 192, it will be noted that contacts 98' through 112' are each connected in series with a resistor, the resistors being indicated by the even numbers from 200 through 214. All of the series connected relay contacts and resistors are connected in parallel by leads 216 and 218. Lead 216 is connected to a transformer secondary winding 220 of transformer 222, having primary winding 224 connected to an A.C. power supply source. A plurality of resistors, generally designated at 226, are connected in series with winding 220 and the parallel combination of the relay contacts and resistors. Thus when all of the relay contacts in this part of aggregate pre-set voltage circuit 192 are open no current flow exists through resistor combination 236, which is made up of resistors 228 and 230 and potentiometer 232. When one or more of relay contacts 98' through 112' are closed a completed circuit will be made so transformer 220 causes current flow through resistor combination 226 to produce a voltage drop thereacross. The magnitude of this voltage drop is determined by the values of the resistors 200 through 214, and upon which of these resistors are rendered effective by closing the relay contacts associated therewith.

In the other part of pre-set voltage circuit 192 shown on the lower half of FIG. 8, it will be seen that contacts 90' through 96' are each connected in series with a resistor, the resistors being indicated by numbers 234 through 240. A secondary winding 242 and a resistance network 244 are connected in series with the contacts. Thus contacts 90' through 96' may be closed to produce a voltage drop across network 244 which has its magnitude determined by the values of resistors 234–240 and by the number of contacts closed.

The resistance values of resistors 200 through 214 are selected so that the voltage drops across combination 226 bear the same bineary relationship to each other as the binary number 800, 400, 200 100, 80, 40, 20 and 10. In other words when only relay contacts 98' are energized the resistor 200 has a resistance value that will cause a voltage drop across combination 226 representative of 800 lbs. When only relay contacts 100' are closed, resistor 202 has a resistance value which will produce a voltage drop across combination 226 representative of 400 lbs. The table below shows the representative voltage drops across combination 226 when no other relay contacts but the one indicated are made.

| Relay Contact Closed: | Voltage Produced Across Combination (Represented in pounds) 226' |
|---|---|
| 98' | 800 |
| 100' | 400 |
| 102' | 200 |
| 104' | 100 |
| 106' | 80 |
| 108' | 40 |
| 110' | 20 |
| 112' | 10 |

Also the values of resistors 200 through 214 are chosen so that if more than one relay contact is closed the total voltage drop across combination 226 will be representative of the combined weight values represented by each of the relay contacts when closed separately. In other words when relay contacts 98' are closed (it represents a voltage for 800 lbs. when closed alone) and contacts 104' are closed (it causes a voltage drop for 100 lbs. when closed alone) the total voltage drop across combination 226 will represent 900 lbs. (800 lbs. + 100 lbs.). As another example when contacts 110' and 112' are closed the total voltage drop across combination 226 represents 30 lbs. (20 lbs. for relay contacts 110' plus 10 lbs. for relay contacts 112').

The part of pre-set voltage circuit 192 shown on the bottom of FIG. 8 develops voltages across network 224 representative of 8000, 4000, 2000 and 1000 lbs. The pre-set circuit is divided so that resistors having fairly low values may be used even for developing the larger voltages. This is accomplished by providing a higher voltage winding 242 for the part of the pre-set voltage circuit producing the voltage drops representative of the greater weights. If the circuit were so divided with the use of separate transformer windings the resistance values for resistors 234-240 would be prohibitive as far as maintaining any degree of accuracy is concerned.

To use the example weight of 4650 lbs. for aggregate #1, which is indicated on card 26 in FIG. 3, it will be remembered that relays 94, 100, 102, 108 and 112 were energized by card reader operation. Hence relay contacts 94', 100', 102', 108' and 112' will close to render resistors 238, 202, 204, 210 and 214 effective in controlling the voltage drop across combinations 226 and 244. Since resistor combinations 226 and 224 are connected in series the produces a combined voltage drop representing 4650 lbs.

Resistors having values identical to those of the resistors in pre-set voltage circuit 192 are also provided for pre-set voltage circuits 194, 196 and 198. These resistors are indicated by the even numbers between 248 and 270 in FIG. 8 for pre-set voltage circuit 194. In pre-set voltage circuit 196 (FIG. 8) resistors 272 through 294 are provided, and resistors 296 through 318 for pre-set voltage circuit 198 are provided. Resistor combinations indicated at 320 and 322, 324 and 326, and 328 and 330 have voltages developed thereacross to represent the required aggregate weights. Since the pre-set voltage circuits are identical in structure and function, no detailed explanation is needed for pre-set voltage circuits 194, 196, and 198. However, it will be indicated which of the resistors are effective for the sample batch formula used throughout this specification. As hereinbefore explained 2630 lbs. of aggregate #2 caused energization of relay coils 124, 130, 132, 140 and 142 to close their relay contacts, in pre-set voltage circuit 194. Resistors 268, 250, 252, 260 and 262 are effective to produce a voltage drop across resistor combinations 320 and 322 representative of 2650 lbs. For 1870 lbs. of aggregate #5, relays 150, 152, 162, 164 and 166 will close their contacts to render effective resistors 294, 272, 282, 284 and 286 in pre-set voltage circuit 196. A requirement of 2330 lbs. of aggregate #6 causes resistors 316, 300, 302, 308 and 310 to be rendered effective in producing the requisite voltage drop across resistor combinations 328 and 330 in pre-set voltage circuit 198.

The voltage drops produced across the several resistor combinations are the opposing voltages, hereinbefore described, for aggregates #1, #2, #5, and #6. These opposing voltages are connected so as to be in phase opposition with any load cell voltage. It will be seen from FIG. 8 that the load cell 60 (schematically indicated) is energized from secondary winding 332 of transformer 222. The load cell supports the weighing hopper, and produces a resultant output voltage between leads 334 and 336 which is proportional to the gross weight carried the by the load cell (gross meaning the weight of the hopper plus whatever weight is in it). The zero balancing circuit 62 (FIGS. 1 and 8) is connected to the load cell and has a supply winding 338 on transformer 222. In circuit 62 a voltage is produced across potentiometer 340 which is in phase opposition to any load cell voltage produced by stressing the load cell. The magnitude of this opposing voltage is mainly controlled by potentiometer adjustment. In operating the system the potentiometer is adjusted to a position which just balances out the load cell voltage, when no load weight is in the hopper. Thus only a load cell voltage proportional to actual load in the hopper will appear between conductor 342 and conductor 334 after the zero balancing compensation has been made.

The resistor combinations 320, 322, 226, 244, 324, 326, 328 and 330 of the pre-set voltage circuits are connected in series as well as being in series with an amplifier input 344 shown in FIG. 14. It will be noted that lead 334 and a lead 346 at the lower right hand corner of FIG. 8 are arranged to connect with the amplifier input. With this ararngement only the algebraic summation of the load cell voltage, opposing voltage of the zero balance circuit 62, and the opposing voltages created by the pre-set voltage circuits, which latter voltages are representative of the weight of each aggregate in the batch, is effective at the amplifier input.

The amplifier 66, which functions to amplify the resultant voltage produced by the load cell and pre-set voltage circuits, is of conventional design and is shown in FIG. 14 of the drawings. The amplifier serves to supply signal voltages for the balance detector 68 and overload detector 348. The function of each of these will be hereinafter described in detail, but for the present it need only be noted that when the voltages from the load cell and pre-set voltage circuits balance so that the input signal to the amplifier is zero the balance detector senses this and operates a relay accordingly.

The opposing voltages, which are representative of the aggregate weights, are rendered effective one at a time in opposing any load cell voltage. The apparatus and circuits for sequentially rendering effective the opposing voltages of pre-set voltage circuits 192, 194, 196 and 198 will now be described. When all of the relay contacts for each pre-set voltage circuit are open no opposing voltage will be created therein. As previously explained the aforesaid relay contacts are controlled by the relay coils in the banks of card reading relays, and each of the relay banks 78, 80, 82, and 84 represents one of the four selected aggregates. Hence control of the pre-set voltage circuits can be achieved by controlling operation of the relay banks.

Referring to FIG. 5 and referring more particularly to relay bank 78, which is for the first selected aggregate it will be seen that the lead 114, which connects together the lower ends of all the relays, is connected to several fixed contacts of a stepping type switch 350. Stepping switch 350 has a movable wiper blade or contact 352, which is adapted to engaeg the fixed contacts one at a time. Wiper 352 is connected to a D.C. supply lead 354 and the other side of the D.C. supply is connected to strip 116 against which the contacts of the card-reader are moved.

It will be seen that stepping switch 350 has seven fixed contacts numbered from 0 through 6, and the movable wiper 352 can be positioned in any of its seven positions. The relays of bank 78 are connected to fixed contacts numbered 1 through 4. Hence whenever wiper 352 is in positions 1 through 4 the relays of bank 78 are capable of being energized if the control card is punched to require their energization. Stepping switches 356, 358 and 360 are provided for relay banks, 80, 82 and 84, all of these stepping switches being identical to stepping switch 350. However, different groups of fixed contacts for each of these other switches are connected to the relays of the associated relay bank. Contacts 2 through 4 of switch 356 are connected to the relays of bank 80, while contacts 3 and 4 of switch 358 are connected to the relays of bank 82. Only fixed contact 4 of switch 360 is connected to the relays of bank 84. Contact 5 of switch 360 is connected to energize an end of sequence relay 362. Stepping switches 350, 356, 358 and 360 are mechanically connected so that the movable contacts of all the switches move together. In practice these several rows of contacts are each contact wafers on a stepping type relay of the class generally used in telephone stepping circuits. The function of the stepping switches is to sequentially render effective the opposing voltages, which represent the aggregate weights. Thus, it will be noted that in its number 1 position wiper 352 of switch 350 renders the relays of bank 78 capable of being energized, since switches 356, 358 and 360 create an open circuit condition. Thus, in the number 1 position of the ganged switches only the card reading relays for bank 78 are effective and this in turn causes only pre-set voltage circuit 192 (FIG. 8) to produce a voltage opposing the load cell voltage. In the number 2 positions of the movable contacts relay bank 80 is also energized as well as relay bank 78. In their number 3 positions the wiper contacts also prepare relay bank 82 for energization as well as keeping banks 78 and 80 in condition to be energized. In the number 4 positions of the wipers all of the relay banks are prepared for energization. The manner in which the stepping switches are operated will later appear.

At the upper left hand corner of aggregate card reader relays 76 of FIG. 5 it will be noted that a pair of relays 364 and 366 are provided. These relays cooperate with the dribble column of control card 26 of FIG. 3 to cut off aggregate feed before the exact required weight is in the hopper and thereby allow for the aggregate in suspension that will fall into the hopper. Relays 364 and 366 have contacts 364' and 366' in the voltage balancing and pre-set voltage circuits of FIG. 8 (upper center of the figure). Contacts 364' and 366' are connected in series with resistors 368 and 370, respectively. A secondary winding 372 is connected to supply current through these resistors and contacts to a potentiometer 374. Thus, the voltage drop produced across potentiometer 374 is determined by which of the relay contacts 364' or 366' are closed to connect one or the other or both of the resistors 368 and 370 in circuit. This voltage drop is in phase with the load cell voltage and so the actual load cell voltage will appear to be increased. Thus, a voltage balance will be reached before the exact required weight is in the hopper to cause the feed to stop so that after the suspended aggregate falls into the hopper the exact weight will be in the hopper. The magnitude of the voltage drop across potentiometer 374 determines when the aggregate feed is cut off, and with the arrangement of card reader relays 364 and 366 three different cut-off voltages are possible. When the number 1 in the dribble column of card 26 (FIG. 3) is punched, relay coil 364 will be energized upon card reader operation to close contacts 364' and connect resistor 368 in circuit. When the number 2 is punched out of the dribble column, relay coil 366 will be energized to connect resistor 370 in circuit. The third cut-off valve is achieved by punching out both numbers 1 and 2 on the card, whereby both resistors 368 and 370 are effective. When neither of the numbers in the dribble column are punched, no prior cut off is had and the exact required weight must be in the hopper before feed is stopped.

As seen on card 26 in FIG. 3, each row that represents one of the aggregates has a dribble column to be punched. A pair of movable contacts is provided in the card reader of FIG. 5 and the pairs of movable contacts are rendered effective one at a time by two stepper switches 376 and 378. In their number 1 positions the switches connect coils 364 and 366 to the movable contacts that are centered over the number 1 and number 2, respectively, in the first horizontal row in the aggregate section of the dribble column on card 26. In their number 2 positions the switches connect the coils to the movable contacts that are aligned over the number 1 and number 2 in the second horizontal row of the aggregate section, etc.

As previously explained card 26 is punched to determine which four or less of the six aggregates are to be present in the batch. As indicated at 380 on FIGS. 1 and 5, card read-out relays are provided which are actuated from the card to select the particular aggregates. Three such relays are provided (lower right hand corner of FIG. 5) and are designated at 382, 384 and 386. As hereinafter explained, through a type of aggregate selector circuit 74 and aggregate feed controls 72 (FIG. 1) these relays select the required aggregates and cause them to be fed into the aggregate weighing hopper 36.

The selector relays are connected to the movable contacts of steppping switches, 388, 390 and 392 of which the number 1, 2, 3 and 4 fixed contacts are connected to movable fingers of the card reader. The fingers connected to the number 1 contacts are physically positioned over the first horizontal row of the aggregate section in the type column, when the card is placed in the holder. Thus, if the number one is punched out relay 382 is energized. If the number 2 or number 4 is punched relay 384 or 386, respectively, will be energized. If the numbers 1 and 2 are punched to call for aggregate #3 coils 382 and 384 will both be energized. To feed aggregate #5 coils 382 and 386 are energized, since the number 4 and 1 are punched from the card. For aggregate #6 coils 384 and 386 are energized.

The selection of the second aggregate is effected by punching out appropriate numbers in the second row of the "type" column in the aggregate section of the card. When stepping switches 388, 390 and 392 have moved their switch arms to their number 2 positions, the punched information as to the next selected aggregate is sensed by the card reader fingers connected to the number 2 fixed contacts. Thus, the combination in which the relays are energized will control which aggregate is the second to be delivered. Similarly, other aggregates are controlled by card punching.

The type of aggregate selection circuit or matrix 74 and aggregate feed controls 72 are shown schematically on the left hand half of FIG. 11. A double-throw single-pole switch 418 may be manually operated to provide for either manual or automatic operation of the batcher. The relay contacts of the type of aggregate card read out relays 382, 384 and 386 of FIG. 5 are indicated in the matrix by adding a prime to the relay number. Contacts 382' and 384' are multiple contacts. These relay contacts are arranged to energize one of six relay coils 394, 396, 398, 400, 402 and 404 in the selector circuit. In the aggregate feed control circuit 72 six electromagnetic feed valves for aggregates #1, #2, #3, #4, #5 and #6 are respectively indicated by numbers 406, 408, 410, 412, 414 and 416 in both FIGS. 2 and 11. The contacts of each relay 394 through 404 are connected so as to energize feed valves 406 through 416 when the relays are energized (the contacts 394' through 404' being shown in their de-energized position in FIG. 11).

To illustrate how aggregate type selector relays 380 (FIG. 5), matrix 74 and aggregate feed circuit 72 operate, the sample batch herein used will be considered. With the number 1 punched in the first line in the type column of the aggregate section, card read out relay 382 will be energized to operate its contacts and in turn energize coil 394. The contacts 394' of coil 394 close a circuit to the aggregate valve 406 for Bin 1 to feed aggregate #1. When the stepping switches 388, 390 and 392 operate and move to their number 2 positions, the card reader fingers cause relay 384 to energize, since the number 2 is punched out of the type column in the second row. This energizes relay 396, by operation of contacts 384' to open valve 408. When switches 388, 390 and 392 are in their number three positions and since aggregate #5 is required, valve 414 will open. This is accomplished by energizing relays 382 and 386 to move their contacts and energize coil 402 and close its contacts 402'. The last ingredient, aggregate #6, is selected by energizing relays 384 and 386, coil 404 and valve 416.

The operation of the aggregate valves as described above is completely automatic and controlled from the punched card. For manual operation of the aggregate feed valves, matrix 74 is rendered completely inoperative by actuating automatic-manual relay contacts 418 to their other position. This opens the circuit to matrix 74 and connects the power lead to the six push button switches 420 through 430. Thus push button 420 can be used to energize feed valve 406, and deliver aggregate #1, button 422 used to feed aggregate #2, etc.

In the aggregate weighing system the operation of the several stepping switches is controlled by balance detector 68 (FIGS. 1 and 14). It should be noted that all of the stepping switches are "ganged" to operate together. A schematic drawing of the stepper circuit 70 (FIG. 1) is shown on the lower left hand corner of FIG. 13. The switches are stepped one step by the energization and subsequent deenergization of a stepping relay coil 440. In general each aggregate is delivered to the hopper until a voltage balance occurs in voltage balancing circuit 64 (FIG. 1) and this voltage balance is sensed by balance detector 68 to cause stepper switch operation and cause the aggregate weighing system to weigh the next aggregate. Operation of the stepper circuit 70 is effected through timer 442 (FIGS. 1 and 12) in a manner now to be described.

The balance detector 68 of FIG. 14 has a relay coil 444 which is energized by the amplified signal voltage or is effectively deenergized when the signal from the amplifier output is zero. The contacts of relay 444 are indicated at 444' in FIG. 12 (left hand side). So long as a voltage unbalance exists in voltage balancing and preset voltage circuits 64 (FIG. 8) as sensed by the balance detector, contacts 444' are closed and relay 446 (FIG. 12) will be energized. When a voltage balance condition prevails coil 446 will be deenergized. The contacts 446' of this relay are in series with coils 448, 450 and 452. Also in series with these coils is a normally closed contact 454' of relay coil 454, which has its energization controlled from contacts 456' of the overload detector 348 (FIGS. 1 and 14). In the energization circuits of certain of the relay coils diodes are placed to isolate the discharge paths of condensers paralleling the relay coil. Typical ones of these diodes are shown at 453 and 455 (FIG. 12). The contacts 456' are opened by relay coil 456 (FIG. 14) whenever the signal voltage indicates that less than the required amount of the aggregate is in the hopper, but if the output of the voltage balancing circuit 64 is of a phase to indicate that more than the required weight is in the hopper (an overload condition) coil 456 closes contacts 456'. Hence, coils 448 and 450 will be energized if no overload condition exists and if the signal voltage is zero to indicate that the required weight of an aggregate is in the hopper, since both contacts 446' and 454' will be closed under these conditions. Since the balance detector might cause contacts 446' to open during stepping operation, contacts 448'' serve as a parallel holding circuit around contacts 446'.

Coil 450 has its contacts 450' in the stepper circuit 70 (FIG. 13), and energization of coil 450 causes stepping operation by energizing stepper coil 440. It will be noted that relay contacts 362' of end of sequence coil 362 (FIG. 5) are provided in stepper circuit 70. When the end of sequence coil 362 is energized to indicate that all of the required aggregates have been delivered to the hopper, contacts 362' are operated to complete a circuit to a stepping switch 458. Stepping switch 458 causes the stepping solenoid 440 to be pulsed, since contacts 440' are in series with coil 440 and stepping switch 458. The stepper solenoid 440 operates until the movable contact of switch 458 reaches the number 0 contact and then the series circuit through solenoid 440 and contact 440' is opened by the stepping switch. It will be seen that holding contacts 362'' are provided for coil 362 (FIG. 5). Thus, after the weighing cycle is completed all stepping switches are automatically returned to their starting positions.

While the stepping switches are being operated to prepare the aggregate weighing system for weighing the next selected aggregate, it is important that the aggregate feed valves 406 through 416 (FIG. 11) be held inoperative and closed. To this end relay coil 450 has an energizing time delay of approximately one second and coil 452 has an energizing time delay of approximately two seconds. After a voltage balance is reached to close contacts 446', relay 448 will immediately be energized to close an energizing circuit to coil 452 through contacts 448' and provide a holding circuit, by means of contacts 448''. Simultaneously, relay contacts 448''' in aggregate matrix 74 (FIG. 11) are opened to render all of the aggregate feed valves 406 through 416 inoperative to prevent any operation of the feed valves. One second later coil 450 becomes sufficiently energized to operate stepper 70 (FIG. 13) and prepare the weighing system for weighing the next ingredient. Relay coil 452 has a two second delay so that one second after the stepper has operated contacts 452' are opened to cause coils 448 and 450 to deenergize. Deenergization of coil 448 opens the holding circuit through contacts 448'' and closes contacts 448''' in the aggregate matrix circuit so that the feed valves can be operated. It should be noted that contacts 446' are opened at this time since a new voltage unbalance condition prevails.

*Construction of cement weighing system 22*

Basically the cement weighing system is like the aggregate weighing system except that only two cements can be selected out of the total of three, both a main and dribble feed of the cements is provided, and electric motors and clutches are used to control feeding of the cements to the hopper. Since the systems are similar and operate in substantially the same way a detailed description of the cement system need not be given.

Referring to FIGS. 1 and 2 it will be seen that groups of card read-out relays indicated at 470 select the types of cements and a group of relays indicated at 472 select the weight of these cements to be delivered to the cement hopper 34. These relays are energized correspondingly to the information punched into control card 26. The relays through stepper circuit 474 cause pre-set voltages to be produced in voltage balancing and pre-set voltage circuits 476, which are in phase opposition to the voltage produced by load cell 478. Zero balance circuit 480 serves to compensate for any tare or dead weight carried by the load cell. Any difference in voltages between those supplied by circuits 476 and 480 and that supplied by load cell 478 are amplified by amplifier 482 and delivered to balance detector 484 and overload detector 486. These detectors operate through timer circuit 488 to control operation of the stepper circuit and also control operation of the motor control circuit 490 for high and low speed electric motors 500 and 502.

Type of cement matrix 504 is provided, and it selects through controls 506 which of the clutches 508, 510 and 512 are to be energized. The clutches either engage or disengage screw type conveyors 518, 516 or 514 which are driven from motors 500 or 502 to deliver the selected cements from the bins to hopper 34. During the fast feed, motor 500 drives the conveyors and during the slow dribble feed, as cut-off is approached, slow motor 502 is used.

Shown in FIG. 6 is the construction and arrangement of the card read-out relays 472 for selecting the weight of cements and relays 470 for selecting the types of cements. Two banks (520 and 522) of relays are provided, since only two cements are to be used for any batch. The relays in bank 520 are numbered from 524 through 550 and those in bank 522 from 552 through 578. The relay banks are identical and the table below shows which of the relays correspond to a particular weight in the binary coded decimal system that is used.

| Relay Number in Bank 520 | Relay Number in Bank 522 | Weight Represented |
|---|---|---|
| 524 | 552 | 4,000 |
| 526 | 554 | 2,000 |
| 528 | 556 | 1,000 |
| 530 | 558 | 800 |
| 532 | 560 | 400 |
| 534 | 562 | 200 |
| 536 | 564 | 100 |
| 538 | 566 | 80 |
| 540 | 568 | 40 |
| 542 | 570 | 20 |
| 544 | 572 | 10 |
| 546 | 574 | 8 |
| 548 | 576 | 4 |
| 550 | 578 | 2 |

Using the example batch shown on card 26 (FIG. 3) of 1000 lbs. of cement #1 and 540 lbs. of cement #3 it will seem that relay 528 will be energized in bank 520 upon card reader operation and relays 560, 564 and 568 are energized in bank 522. Relay bank 520 is first rendered effective by its stepping switch 580 and then later bank 522 is rendered effective by stepping switch 582.

Relay coils 584 and 586 are energized in accordance with which of the cements are to be present in a batch. In the example, cement #1 is to be weighed first. Hence, when the stepping switches 588 and 590 are in their number 1 positions, relay coil 586 will be energized, since the number 1 in the first row in type column on card 26 is punched out. As hereinafter explained this causes feed of cement #1. Likewise after cement #1 is fed, relays 584 and 586 will both be energized to cause feed of cement #3. It will be noted that an end of sequence relay 592 will be energized after both cements have been weighed.

In the aggregate system, hereinbefore described, errors resulting from the "standing column" of material not yet delivered to the hopper were compensated for by cutting off material feed when the weight in the hopper was a few pounds less than required. In the cement and water weighing systems a different method is used, since the method used for the aggregate would not be sufficiently accurate. To this end relays 594 and 596 are provided and have their energization controlled by means of stepping switches 598 and 600. Alternate fixed contacts of these switches are connected to movable fingers of the card reader, and these movable fingers are centered over numbers in the dribble column of card 26. With the example used only relay 596 will ever be energized, since only the number 1 is punched out in both rows of the card in the dribble column of the cement section. However, switch 600 will cause the relay to be alternately energized and deenergized for a purpose hereinafter explained.

The voltage balancing and pre-set voltage circuits 476, load cell 478, amplifier 482, balance detector 484, overload detector 486 and zero balance circuit 480 are shown in FIG. 9. The amplifier, overload detector and balance detector are identical to those of the aggregate system and are only indicated schematically on FIG. 9 since they are shown in detail in FIG. 14. Also the load cell and zero balance circuit are identical to those of the aggregate system and need not be explained.

The pre-set voltage circuit for the first selected cement ingredient is indicated at 587 while the pre-set voltage circuit for the second selected cement ingredient is designated at 589. These circuits are divided and energized from a low and high voltage transformer winding so that the resistance values need not be unreasonably high as previously explained.

The contacts for the card read-out relays in FIG. 6 are indicate in FIG. 9 by adding a prime to the relay numbers. The four resistor combinations that are connected in series with the load cell and amplifier are designated by numbers 591, 593, 595, 599. The resistors for controlling the pre-set voltages produced across the resistor combinations are designated by the numbers between 602 and 656. Using the example weight of 1000 lbs. of cement #1 and 540 lbs. of cement #3, resistor 606 in pre-set voltage circuit 587 will be the only effective resistor. Resistors 638, 642 and 646 are the only effective ones in pre-set circuit 589. Thus, a voltage drop representing 1000 lbs. will be developed across resistor combination 593 and a voltage drop representing 540 lbs. will be produced across combinations 595 and 599.

Dribble circuit 660 is provided in the voltage balancing circuit of FIG. 9, and has a resistor 662 connected in series with the several resistor combinations. The voltage drop produced across resistor 662 is in phase with the load cell voltage and its magnitude is determined by which of relay contacts 594' or 596' are closed to connect resistors 664 or 666 in circuit. If resistor 666 is connected in circuit by closure of contacts 596' a relatively small dribble voltage will be produced across resistor 662. If only resistor 664 is effective a higher dribble voltage is produced, and if both resistors are effective a still larger dribble voltage appears. If neither contacts 594' nor 596' are closed, zero dribble voltage is produced. Thus, the magnitude of the dribble voltage is determined by which of the numbers are punched out of the card on the cement section in the dribble column.

In FIG. 6 it will be noted that when the stepping switches are in their number 1 positions only the relays of bank 520 are readied for energization, since switch 582 does not prepare bank 522 for energization. At the same time switches 598 and 600 cause relay coils 594 and 596 to be energized if the card punching requires. Hence in the circuit of FIG. 9 a voltage is produced in pre-set voltage circuit 587 and in dribble circuit 660, but not in pre-set voltage circuit 589. The dribble voltage opposes the pre-set voltage so that a voltage balance occurs with the load cell voltage before all of the required weight of cement #1 has reached the hopper. Upon sensing the voltage balance the balance detector causes the switches to be stepped to their next positions. Thus the card read-out relays for the first ingredient will still be capable of energization, but the stepping switches 598 and 600 deenergize relays 594 and 596 to reduce the dribble voltage to zero. This creates a new voltage unbalance condition and cement feeds into the hopper again, but at a reduced speed because the control circuit has disconnected the high speed motor 500 and connected the slow speed motor 502. In their number 3 positions the stepping switches again render the dribble relays 594 and 596 capable of being energized, and additionally energizes the card read-out relays of bank 522 in accordance with the punched card information. Thus a voltage balance will occur again with the dribble voltage effective and upon sensing the balance, the fast feed of the second cement will be reduced to a slow feed so that last few pounds will be dribbled into the hopper.

The stepper circuit 474 for the cement weighing system, shown on FIG. 13, is essentially identical to the stepper circuit 70 (FIG. 13) of the aggregate system. The timer circuit 488 for the cement system, shown on FIG. 12, is also essentially identical to timer 442 of the aggregate system except that an additional relay 670 is provided. The parts in stepper circuit 474 and timer circuit 488 that respectively correspond to the parts in stepper and timer circuits 70 and 442 are designated by simply adding the letter "C" in front of the indicating number. The operation will be briefly explained.

When the balance detector senses a balance, it opens contacts C444' to deenergize relay C446 and close contacts C446'. This energizes coil C448 to close a holding circuit by means of contacts C448" and close a circuit to coil C452 via contacts C448'. If no overload exists, coil C454 is deenergized to maintain contacts C454' closed. Coil C450 will energize after a one second delay to close the contacts C450' in stepper 474 (FIG. 13) to operate the stepper. Still another second later coil C452 is energized to open contacts C452' and break the circuit to coils C448 and C450. Since another voltage unbalance then obtains the coils remain deenergized until a subsequent voltage balance occurs.

When coil C448 is energized to effect stepping operation the cement feed motors must not operate to deliver cement to the hopper. To this end the contacts C448" close a circuit to coil 670 which has contacts in motor control circuit 490 (FIG. 1) as hereinafter described.

The type of cement matrix 504 (FIG. 1) is shown in detail in FIG. 11. It will be seen that a switch leg 672 of an automatic-manual switch is provided to complete the circuit to the matrix if card controlled automatic operation is desired. The relay contacts 584' and 586' of type selector relays 584 and 586 (FIG. 6) are arranged to energize any one of four relay coils 674, 676, 678 and 680. When relay 586 is energized by the card reading contacts to indicate cement #1 is to be delivered, coil 674 is energized. The contacts 674' in the clutch engaging control circuit 506 are closed to energize clutch 512 for feed from Bin 1 (FIG. 1). If cement #2 is to be fed, coil 676 is energized to close contacts 676' to engage clutch 510 and likewise for cement #3 clutch 508 is engaged by means of coil 678 and its contacts 678'. If neither relay 584 nor 586 is energized to indicate that no selection of cement has been made on the card, the relay 680 will be energized. For manual operation push buttons 682, 684 and 686 are provided for clutches 512, 510 and 508 respectively. These push buttons are able to operate the clutches when automatic-manual switch 672 is in its manual position.

While the selection of the cements is accomplished through matrix 504 or through push button control during manual operation, the speed at which the selected cement is fed is controlled by motor control circuit 490 (FIGS. 1 and 11). An automatic-manual switch leg 688 is provided for the motor control circuit 490, and in its automatic position either fast motor 500 or slow motor 502 is energized by means of relay contacts 690' depending upon which circuit is closed. The coil 690 for contacts 690' is shown at the upper center of FIG. 13. This coil has its energization controlled by stepping switch 692, which has the first and third contacts connected to the supply line. Thus, coil 690 will be energized when the switch is in positions 1 and 3 to actuate contacts 690' and operate the high speed motor 500. Thus, when the stepping switches are in their number 1 and 3 positions to provide the main feed of an ingredient, the fast motor will be operated. In the other positions of the stepping switches either dribble feed or no feed at all is required and relay 690 will not be energized and slow motor 502 is actuated. It should be understood that even if the motors are operating no feed of the cement occurs until a clutch is engaged.

Normally open relay contacts 670' are connected in series with contacts 690' and are closed to enable the motors to be energized only when coil 670 of FIG. 12 is deenergized. It will be remembered that coil 670 is deenergized whenever stepping operation is taking place. Thus, the motors are both incapable of operation when the switches are stepping to prevent inadvertent delivery of material to the hopper at these times.

Normally closed contacts 680' are also in series with contacts 690'. Coil 680 is in matrix 504, (FIG. 11) and, as previously explained, is energized whenever no selection of cement has been punched into the card. Thus, if no cement is to be delivered, contacts 680' prevent energization of the motors.

As hereinbefore explained, coil C454, (FIG. 12) is energized by the overload detector 486 to prevent stepping operation. One of the novel features of the invention is to prevent overload detector operation during the main or fast feed of the cements but to render the overload detector operative only in dribble feed. The reason for this is that if too much of an ingredient was delivered to the hopper during main feed then the overload weight would have to be physically removed. Immediately after this the dribble operation would put some if not all of the removed weight loads in the hopper. By making the overload detector effective only in the dribble feed this unnecessary removal of ingredients is prevented. Relay coil 690 (FIG. 13) is energized whenever main feed operation is under way, but is deenergized during dribble operation. Normally closed contacts 690'' for this relay are provided in series with relay C454. Thus the overload detector is effective only during dribble feed.

*Construction of water weighing system*

The water weighing system 20 (FIG. 1) is similar in construction and operation to the other two weighing systems, and only a brief description will be given. The circuits for the water system are simpler than those of the other systems, since only one ingredient (one kind of water) is to be weighed.

A single bank 700 of card read-out relays is provided (FIGS. 1 and 4). The relays numbered 702 through 726, are energized to represent weights of 2000, 1000, 800, 400, 200, 100, 80, 40, 20, 10, 8, 4 and 2 lbs. respectively, when these numbers are punched out of the water section on card 26 (FIG. 3). In the voltage balancing and pre-set voltage circuit 728 (FIGS. 1 & 7), the contacts for the card readout relays are indicated by adding a prime to their numbers. The resistor combinations across which the pre-set voltage is developed are indicated at 730 and 732. The dribble circuit 734 (FIG. 7) is similar to that of the cement system and is controlled from relays 736 and 738 in the card reader part of the system shown in FIG. 4. Since there is only one ingredient to be delivered, the dribble relays are effective only in the number one position of the stepping switches 740 and 742, which is the main feed position.

The zero balance circuit 744 and load cell 746 are shown schematically on FIG. 1 and in greater detail on FIG. 7. The amplifier 748, balance detector 750 and overload detector 752 are indicated by boxes on FIG. 7, since they are identical in construction to those shown on FIG. 14.

The timer 754 (FIG. 12) is almost identical with the timer circuit 442 for the aggregate system shown on the same figure. This is indicated by adding a "W" in front of each corresponding designating number in timer 754. Also the stepper circuit 756 (FIG. 13) for the water system is similar to those of the aggregate and cement systems, and a "W" is added to corresponding indicating numbers to illustrate the similar parts. The end of sequence relay 758, having contacts 758' in the stepper circuit, is shown at the right hand side of FIG. 4. Also holding contacts 758'' are provided on FIG. 4 for coil 758.

An important concept of the present invention resides in the provision of mechanism for compensating for moisture content in the aggregate sand. To this end the aggregate weighing system must not terminate its weighing operations before the water system has completed its weighing operation. This is accomplished by providing a set of contacts 758''' in series with the homing circuit of stepper 70 for the aggregate system. Thus stepper 70 cannot operate to return the aggregate system to its start position until after the water system has completed its weighing function, since at this time end of sequence relay 758 (FIG. 4) for the water system will be energized to close contacts 758'''.

No matrix is needed for the water system since this has no type selection. A selector circuit 760 (FIG. 1) for selecting fast or dribble feed is used to control energization of main and dribble valves 762 and 764 (FIG. 2). These electromagnetic valves are shown at the center of FIG. 11. The selector circuit is shown on the upper right hand corner of FIG. 13. An automatic-manual switch 766 serves to connect the main feed selector coil 768 and dribble feed selector coil 770 for automatic operation under control of stepping switches 772 and 774 or for manual operation under control of fast feed push button 776 and dribble feed push button 778. The contacts of coils 768 and 770 are arranged in series with solenoid valves 762 and 764. In the manual position of switch 766, main feed coil 768 is energized by pushing main button 776. For dribble feed, push button 778 is operated to energize both main and dribble feed coils 768 and 770. In the present embodiment, because of the arrangement of the valves, both coils must be energized for the reduced dribble feed. For automatic operation the energization of coils 768 and 770 is controlled through stepping switches 772 and 774. In their number 1 positions only main feed coil 768 is energized. In their number 2 positions both coils 768 and 770 are energized to cause a dribble feed.

As previously described in connection with the cement weighing system it is important to render the overload detector inoperative during main feed operation, but make it operative during dribble feed. To this end relay coil 781 is connected to the number 1 contact of stepping switch 774. This coil will be energized during main feed operation. The normally closed contacts 781' are connected in series with relay W454 in the timer 754 (FIG. 12) so that this overload detector relay cannot operate during main feed, but can operate during dribble feed.

*Moisture compensation*

The sand storage pile for a batching installation accumulates moisture and if no moisture correction were made, the batch would be short of sand and have an excess of water, since the sand usually contains an appreciable percentage of moisture. Consequently, it is necessary to cause the introduction of additional sand and the subtraction of water from the batch as a function of percent of moisture present in the sand.

Various techniques are available to determine percent moisture and these are not within the scope of the invention. However, when the moisture content has been determined, it is only necessary to set a dial to the percentage and the circuits will make the proper sand and water adjustments.

Assume a batch which should contain 10,000 pounds of sand and 5,000 pounds of water. If the moisture content is 20%; the actual results, without compensation, will be:

$$10,000 - \frac{20 \times 10,000}{100} = 8,000 \text{ lbs. of sand}$$

$$5,000 + \frac{20 \times 10,000}{100} = 7,000 \text{ lbs. of water}$$

A correction of 20% is necessary, but is complicated by the fact that the sand added for correction is also wet; therefore, it is necessary to over correct.

Returning to the example the correction factor should be:

$$\frac{20}{80} = .25 = 25\%$$

The aggregate scale will then receive:

$$10,000\# + 10,000 \frac{(25)}{100} = 12,500 \text{ lbs. of wet sand}$$

But this is 20% moisture, so that the actual amount of dry sand is:

$$12,500 - \frac{12,500 \times 20}{100} = 12,500 - 2,500 = 10,000\#$$

(10,000 lbs., is the desired amount of dry sand).

Since the sand contained water, it is necessary to effect a correction in the water bridge circuit also: The amount of water in the sand is:

$$\frac{20}{100} \times 12,500 = 2,500\#$$

It must be subtracted from the pre-set voltage of water.

$$5000\# + 2,500\# - 2,500\# = 5,000\# \text{ of water}$$

Moisture correction is therefore, a function of the amount of sand in the batch and the percent of water it contains. The formulae for determining the quantities of sand and water required are developed below.

$DS$ = Wt. of sand (dry) desired in batch
$S$ = Wt. of sand in sand hopper
$\%M$ = Percent moisture in sand, $S$
$w$ = Wt. of water in sand, $S$
$W$ = Wt. of water desired in batch
$WA$ = Wt. of water in water hopper Given quantities are $DS$, $\%M$, and $W$ $$\%M = \frac{w}{S} \quad S = DS + w \quad W = WA + w$$

Desired quantities are $S$ and $WA$ $$S = DS + w \quad w = S \times \%M$$
$$S = DS + S \times \%M$$
$$DS = S - S \%M$$
$$DS = S(1 - \%M)$$
$$S = \frac{DS}{1 - \%M}$$

$$W = WA + w \quad w = S \times \%M$$
$$W = WA + S \times \%M$$
$$WA = W - S \times \%M$$

The following table is a calculation of what weight of wet sand (aggregate #1) is needed in the hopper and what weight of water is needed for different percents of moisture when 4000 lbs. of dry sand and 1000 lbs. of water are to be in the batch.

*Moisture compensation table*

Aggregate:
  Weight on Scale = $\frac{\text{Desired Weight}}{(1 - \%M)}$

Water:
  Weight on Scale = Desired Weight − Weight of Water in Agg.

| Percent Moisture (×100) | Weight Agg. #1 | Weight Water |
|---|---|---|
| 0 | 4000. | 1000 |
| 1 | 4040.4 | 959.6 |
| 2 | 4081.6 | 918.4 |
| 3 | 4123.7 | 876.3 |
| 4 | 4166.7 | 833.3 |
| 5 | 4210.5 | 789.5 |
| 6 | 4255.3 | 744.7 |
| 7 | 4301.1 | 698.9 |
| 8 | 4347.8 | 652.2 |
| 9 | 4395.6 | 604.4 |
| 10 | 4444.0 | 555.5 |
| 11 | 4494.4 | 505.6 |
| 12 | 4545.4 | 454.6 |
| 13 | 4597.7 | 402.3 |
| 14 | 4651.2 | 348.8 |
| 15 | 4705.9 | 294.1 |
| 16 | 4761.9 | 238.1 |
| 17 | 4819.3 | 180.7 |
| 18 | 4878.0 | 121.9 |
| 19 | 4938.3 | 61.7 |
| 19.5 | 4968.9 | 31.1 |
| 20 | 5000.0 | 0 |

Moisture compensation is accomplished by providing a compensating voltage circuit in both the aggregate and water voltage balancing and pre-set voltage circuits. Both compensating circuits are essentially like the pre-set voltage circuits and the resistors in these circuits are rendered effective by card read-out relays that are energized simultaneously with the card read-out relays for the sand aggregate. Referring to FIG. 5 it will be seen that the card read-out relays 90 through 112 for the first selected aggregate (sand) are paralleled by relays 780 through 802. In the aggregate pre-set voltage circuit 824 (FIG. 8) the contacts of these relays (indicated by a prime added to the coil number) are connected in series with resistors numbered between 804 and 820. These resistors control the voltage drop produced across a potentiometer 822. The voltage drop produced across potentiometer 822 will equal the combined voltage drop across resistor network 226 and 244 of the pre-set circuit 192, except that no resistor capable of producing the 40, 20 or 10 lbs. voltages is provided in the moisture compensating circuit 824. The reason for omitting these lower values in that the instruments for measuring the percent moisture are not sufficiently accurate or the moisture content of the sand varies too much from one quantity to the next to warrant such a fine compensation.

With the example used herein of 4650 lbs. of a first aggregate (sand) it will be noted that contacts 782', 790' and 792' are closed to render resistors 806, 814 and 816 effective to produce a voltage drop across potentiometer 822 representative of 4600 lbs. A compensating circuit 826, similar to compensating circuit 824, is also provided in the voltage balancing circuit 728 of the water system (FIG. 7). Compensating circuit 826 is divided in a manner similar to the pre-set voltage circuits in order to keep the resistances at practical values, but this is not necessary for circuit 824. Relay contacts for the card read-out relays 780 to 802 are also provided in circuit 826 and are designated by adding a double prime to the relay numbers. Resistors 928 through 936 are connected to contacts 780" through 788" and adapted to produce voltage drops of 8,000, 4,000, 2,000, 1,000 and 800 lbs., respectively, across potentiometer 938. Resistors 940 through 952 are connected to contacts 790" through 802" and serve to produce voltage drops of 400, 200, 100, 80, 40, 20 and 10 lbs., respectively, across potentiometer 954. The combined voltage drop produced across potentiometers 938 and 954 is equal to 4650 lbs. in the example used since relay contacts 782", 790", 792", 798"

and 802″ are closed by their relays to connect in circuit resistors 930, 940, 942, 948 and 952.

The voltage drop produced across potentiometer 822 in compensating circuit 824 (FIG. 8) for the aggregate system is in phase opposition to any load cell voltage and in phase with the pre-set voltage of the several pre-set voltage circuits 192, 194, 196 and 198. Not all the voltage produced across potentiometer 822 is effective in the voltage balancing circuit including load cell 60, zero balancing circuit 62, the pre-set voltage circuits and amplifier input. Only a certain amount of the voltage is picked off potentiometer 822, the amount being determined by the percent of moisture in the sand in accordance with the formulae hereinbefore developed. Likewise, the movable contacts of potentiometer 938 and 954 in the water system are adjusted to pick off only a part of the voltage as determined by percent moisture. All of the movable contacts of potentiometers 822, 938 and 954 are ganged together for simultaneous adjustment.

Without repeating the particulars of the formulae hereinbefore developed, it will be remembered that due to its moisture content more wet sand is needed and less water is required as the percent of moisture increases. Thus by having potentiometer 822 movable in one direction to increase the effective compensating voltage in the aggregate circuit (to deliver more sand to the hopper) while the movable contacts of potentiometers 938 and 954 of the water system are moving in the other direction (to reduce the amount of water that will be delivered) a single control achieves moisture compensation. An indicator, not shown in the drawings and marked off in percent moisture will be associated with the movable contacts. Hence, the movable contacts need only be adjusted to a position representing the percent moisture of the sand and automatically the required additional amount of sand and reduced amount of water will be allowed for.

In the example used 4650 lbs. of sand are required and 752 lbs. of water are required in the batch. When the percent moisture is 10% the control member for the potentiometer contacts will be positioned at its 10% mark. This causes the compensating circuit in the aggregate system to produce a voltage representative of approximately 512 lbs. and causes the compensating circuit in the water system to produce a voltage of approximately 417 lbs. because about 417 lbs. of water will be added in the sand. When the stepping switches of the aggregate system cause card read-out relays for the first selected aggregate to be energized and before any material is delivered to the hopper, pre-set voltage circuit 192 produces a voltage equal to 4650 lbs. of material and compensating circuit 824 produces a voltage equal to 512 lbs. These are in series and combine to establish a total opposing voltage of 5162 pounds. Thus a voltage balance will not occur in the aggregate system until 5162 lbs. of wet sand are in the hopper. At the same time the water system pre-set voltage circuit 728 produces 752 lbs. of voltage, but the compensating voltage is oppositely phased and equal to 417 lbs. so that a voltage balance occurs after only 335 lbs. of water is in the hopper.

If the aggregate system were allowed to complete its weighing operation of the first aggregate before the water system and move its stepping switches back to their initial positions, the banks of card read-out relays that control the compensating circuits 824 (FIG. 8) and 826 (FIG. 7) would all be deenergized. This would eliminate the compensating voltages. In the aggregate system this would not matter since the weighing operation is completed, but in the water system if the compensating voltage is prematurely withdrawn far too much water would be delivered to the hopper. Thus, as hereinbefore explained contacts 758‴ of end of sequence relay 758 (FIG. 4) for the water system, prevent homing operation of the aggregate stepper 70 (FIG. 13) until the water system has finished its weighing operation.

Control circuit for card reader

The electrical control circuit for the card reader 28 (FIG. 1) is generally indicated at 828 on the upper half of FIG. 13, and is connected between supply leads 830 and 832. A normally open card hold switch 834 and a card reader contact moving relay coil 836 are connected in series between the supply leads. When switch 834 is pushed to its closed position, coil 836 is energized to move the card reading contacts through the card holes toward the terminal strip of the card reader.

The mechanical apparatus for moving the contacts is not shown in the drawing, and it need only be appreciated that energizing coil 836 moves all of the contacts simultaneously. When the coil 836 has completed movement of the contacts, a mechanical latch (not shown in the drawings) engages the contact moving mechanism to hold the contacts in their closed position against the card or the terminal strip. The contacts are resiliently urged away from the card and terminal strip, but the latch prevents movement in this direction. A solenoid release for the latch is provided in coil 838, the energization of which is controlled by normally open push button 840. Therefore, to move the card reader contacts away from the control card and terminal strip it is only necessary to momentarily close push button 840 and the contacts spring back to their open positions.

In order to release the control card from the card holder a time delay relay coil 842 is provided in parallel with latch release coil 838. The contacts 842′ of this relay are connected in series with a card release solenoid 844, which when energized allows the control card to fall out of the card holder. Upon closing push button 840 latch release coil 838 releases the latch to return the movable card reader contacts out of engagement with the card. At the same time relay coil 842 is energized to close contacts 842′ and operate the card release solenoid 844. Even though card release button 840 is only momentarily pushed, upon its release, time delay relay 842 will not immediately open contacts 842′ due to the time delay character of the relay. Therefore coil 844 will stay energized at least long enough to let the card fall free of the card reader.

Card positioning interlock

Provision is made for preventing operation of the batcher unless the control card is properly positioned in the card reader. It will be noted in FIG. 3 that the lower left hand corner of card 26 is cut away and that all the other corners are not cut away. On the right hand end of the card read-out relay circuit for the water system shown in FIG. 4, it will be seen that a pair of relay coils 846 and 848 are provided. The movable contact of the card reader connected to coil 846 is positioned so that when the card is properly placed in the card reader the cut-away corner will allow the movable contact to move against conductor 851 and energize coil 846. The movable contact for coil 848 is disposed in the card reader so that it engages the lower right hand corner of the card 26 when the card is properly placed in the card reader, so that coil 848 is not energized when the card reader is actuated. It will be noted that the operating circuit for the relay coils 846 and 848 bypass contacts 896C and is connected directly to the direct current supply (not shown). The contacts of relay coils 846 and 848 are connected in the control circuit to render the batcher inoperative until the card is properly located in the card reader. Contacts 846′ are normally open contacts so that they are closed to render the control circuit effective only when coil 846 is energized. Contacts 848′ are normally closed contacts and are closed when coil 848 is not energized. With this arrangement the contacts hold the entire batching system in an inoperative condition until the control card is properly positioned in the card reader. If, for example, the card were inserted in an upside down relationship, coil 846 would not be energized and contacts 846' would remain open. If the card were reversed in an end for end manner, coil 848 would not be energized and coil 846 would be energized so that both contacts 846' and 848' would remain open. Obviously for any other incorrect positioning of the card, the system will be held inoperative.

*Control circuit 50 (FIG. 10)*

The operation of the concrete batcher may be either automatic under control of the card or manual under control of push buttons. To this end an automatic-manual switch 850 is used to energize or deenergize relay 852. Switch 850 stays in the closed or opened position, depending on which way it is thrown and in the manual position it energizes coil 852. Energizing the coil causes the contacts 852' to be moved to the right as viewed in FIG. 10 to connect the power lead 854 directly to a multi-pole hopper discharge switch 856. When the discharge switch is pushed to the right (FIG. 10) the relay coils 858, 860 and 862 are readied for energization. However, these relays are not energized unless limit switch 864 is closed in one of its two circuit closing positions. The limit switch is operated from diverter gate 866 on the gathering hopper 38 (FIG. 2) which diverts the batched ingredients to either the stationary or portable mixers 42 or 40. The diverter gate 866 is schematically shown on FIG. 10 and has its operations controlled by a wet-dry switch 868. When switch 868 is moved to the dry position to indicate that the water is not to be added to the gathering hopper and that the aggregate and sand are to be discharged into the portable mixer, diverter gate 866 is energized to move the gate 870 to the left as viewed in FIG. 2. When the gate reaches its closed position to cut off delivery to the stationary mixer, limit switch 864 will be closed, but not until the gate has reached this position. Likewise limit switch 864 will close when the gate is fully closed in the other direction to divert the batch to the stationary mixer.

Thus, it will be seen that during manual operation, discharge switch 856 can be operated to energize coils 858, 860 and 862. The dump gates for the aggregate and cement hoppers are indicated at 872 and 874 in FIG. 2, while the dry mix valve is designated at 44 and the wet mix valve is designated at 48. The relay contacts of coils 858, 860 and 862 are connected in series with these dump gates and valves so that they are actuated when these coils are energized. Selection as to whether the wet or dry mix valve is operated is controlled by a switch 876 operated by diverter 866 and ganged with limit switch 864 of the diverter gate 870. When the gate is moved to a position where the material is to be delivered directly to the portable mixer the dry mix valve 44 is actuated and in the other position of the diverter gate the wet mix valve 48 is actuated.

When automatic-manual switch 850 is moved to its manual position, relay 852 is energized to operate the switch members 418, 672 and 688 (FIG. 11) in the aggregate and cement matrix circuits 74 and 504 and in the water feed circuit 490. Switch members 418, 672 and 688 are contacts on relay 852 and these contacts are moved to one position or the other depending upon whether or not relay 852 is energized.

Before the weighing system can be operated with automatic card control, the card must be properly positioned in the holder and all of the discharge gates and valves closed on the weighing hoppers. To this end contacts 846' and 848' of the card position sensing relays 846 and 848 (FIG. 4) are provided in the control circuit (FIG. 10). In series with these are three sets of contacts 880', 882' and 884' that are closed by limit switches on the discharge gates of the cement and aggregate weighing hoppers and on the wet and dry discharge valves for the water hopper. The limit switch 879 of the aggregate discharge gate 872 is closed whenever the gate is open. This energizes coil 880 to open contacts 880'. If gate 872 is closed, coil 880 is denergized to close contacts 880'. Contacts 882' are controlled in the same way by coil 882 and limit switch 886 for gate 874 of the cement hopper. In the case of the water system two limit switches are provided, one for the dry discharge valve 44 and one for the wet discharge valve 48. The limit switch for the wet valve is designated at 888 and for the dry valve at 887.

Whenever all discharge gates and valves for the weighing hoppers are closed and the card postions sensing contacts are closed, relay coil 890 will be energized. A start-stop control circuit 892 is shown at the right hand side of FIG. 10 and the contacts 890' render the circuit capable of operation under control of start button 894 as hereinafter explained. This prevents automatic operation unless the card is properly positioned and all the discharge gates and valves for the weighing hoppers are closed.

In stop-start circuit 892 the overload balance detector relay contacts 454'', C454'' and W454'' and contacts 852'' of automatic-manual relay 852 are all connected in series with start switch 894. The relay contacts of the overload detectors will be opened if any material is left in a weighing hopper from the previous batch, since before the start button is pushed none of the pre-set voltages are effective and the only effective voltage in the voltage balancing systems is the load cell voltage. Thus the overload detector would respond to load cell voltage produced by material in the hopper and hold the start button ineffective until the hopper has been dumped. This requires that the previous batch be dumped before the next batch is started. Contacts 852'' are opened by placing automatic-manual switch 850 in its manual position. Thus the start-stop circuit can only be used during automatic, card-controlled operation.

When start button 894 is closed it energizes relay coil 896, provided all the above described conditions have been met. Coil 896, which will be called the start-stop relay, has a large number of contacts in the several parts of the batcher to cause the circuits to be readied for automatic operation. In the control circuit (FIG. 10) contacts 896' are provided, the operation of which will be hereinafter described. In stepper circuits 70, 474 and 756 (FIG. 13) the contacts 896'', C896'' and W896'' are closed to ready the stepper circuits for operation. In control circuit 828 for the card reader (FIG. 13) contacts 896''' are provided. When coil 896 is energized to cause automatic operation contacts 896''' open to make the card release button 840 inoperative. In FIG. 13 contacts 896A prepare the high-low cement feed motor control relay 690 for energization under control of switch 692. Contacts 896B on FIG. 12 energize the timer circuits 442, 488 and 754. Also the start switch 894 has a blade and contacts indicated at 894' in FIG. 12 to open the circuit to the timers when the start button is pushed. The card read-out relay circuits for the three weighting systems, shown in FIGS. 4, 5 and 6 are each energized by contacts 896C.

A hold circuit is created for coil 896 after momentary energization thereof through emergency stop switch 898 and contacts 896D of relay 896. Coil 896 can be deenergized at anytime by simply pushing stop button 898. This opens all the contacts of coil 896 and discontinues operation until the start button is closed again.

Before the batch can be dumped the batching operation must have been completed, which completion is indicated by energization of the end of sequence relays 758 (FIG. 4), 362 (FIG. 5) and 592 (FIG. 6) of the aggregate, cement and water card read-out relay circuits. In FIG. 10 the contacts 262A, 592A and 758A of these relays are arranged in series with relay 900. The contacts of relay 900 are indicated at 900' and serve to prevent dumping of a batch from the weighing hoppers until operations for aggregate, cement and water systems are completed.

When automatic-manual switch 850 is in its automatic position, coil 852 is de-energized and the contacts 852' will be in the position shown on FIG. 10. A circuit will be completed through contacts 852', contacts 896', contacts 900' and wet-dry switch 868 to the discharge switch 856. If coil 900 is energized to indicate that the weighing operation of the aggregate, cement and water systems is complete, and wet-dry switch 868 is in dry position, discharge switch 856 can be pushed to operate the weighing hopper discharge gates and valves 872, 784, and 44 or 48. When wet-dry switch 868 is in its wet position, it will be noted that another set of contacts 902' are connected in series with the discharge switch 856 so that no discharge can be had until these contacts close. The coil 902 is energized by a dump switch 904 that is operated by stationary mixer 42 (FIG. 2) to close the switch when the stationary mixer returns to the position in which it can receive a batch from the gathering hopper.

After a wet-mix has been discharged in the stationary mixer from the gathering hopper, the mixer is operated to mix together the ingredients. Then the batch is dumped from the stationary mixer into a portable mixer and the stationary mixer is returned to its horizontal position for receiving another batch from the gathering hopper. Obviously means must be provided to prevent dumping a second batch into the stationary mixer until the stationary mixer has dumped the first load and returned to the proper position. Thus dump switch 904 is momentarily closed as the stationary mixer returns to its horizontal position and this energizes coil 902 to close contacts 902' so that the discharge switch 856 can again be operated. A hold circuit for coil 902 is completed through contacts 902' and switch 888. This hold circuit is broken whenever the wet discharge valve 48 is open. The wet mix valve is operated on discharge of the weighing hoppers into the stationary mixer. By breaking the holding circuit, it becomes necessary for the stationary mixer to dump out its ingredients and return to its horizontal position before the circuit to coil 902 is again completed. This prevents dumping one wet mix batch on top of another in the stationary mixer.

*Automatic card controlled operation*

After the control card 26 (FIG. 3) has been punched to select which aggregates and cements are to be present in the batch, to select how much of each ingredient is to be present, to compensate for "standing column error" in the aggregate weighing system and to select the amount of dribble feed for the water and cement systems, the card is inserted in card reader 28 (FIG. 1). Since automatic operation is desired, automatic-manual switch 850 is moved to the automatic position to prepare the control circuit (FIG. 10) for automatic operation and prepare the water, cement, and aggregate selection and feed circuits shown on FIG. 11 for automatic operation. The push button 834 in card reader control circuit 828 (FIG. 13) is momentarily pushed to operate the card reader. Upon closing start button 904 (FIG. 10), start relay 896 will be energized if the previous batch has been dumped from the weighing hoppers so that the over-load detectors cause contacts 454'', C454''' and W454'' to close (contacts 852'' being closed since automatic-manual switch 850 is in its automatic position). The start switch is ineffective unless contacts 890' have been closed by coil 890, which indicates that the discharge gates and valves on the weighing hoppers are all closed and that the card is properly positioned in the reader as determined by card position sensing coils 846 and 848 (FIG. 4). Once operation is started it can be stopped by opening emergency stop button 898.

When weighing operation starts, all of the stepping switches of the several weighing systems will be in their zero positions, and (assuming that zero balance has been made to compensate for dead or tare loads) zero signal voltage is applied to the amplifier of each weighing system.

The balance detectors will sense this and cause the several stepping circuits to move the stepping switches to their number 1 positions.

Referring first to the aggregate weighing system, when the stepping switches reach their number 1 positions, bank 78 of the card readout relays is prepared for energization as required by card punching. At the same time, the type of aggregate selection circuit indicated at 380 (FIG. 5) will be energized in accordance with the type of aggregate first to be weighed. Also, at this time the relay coils 364 and 366 (upper left hand corner of FIG. 5) will be energized in accordance with how much correction is to be made for "standing column error." In turn, the relays of bank 78 cause their contacts to close in the pre-set voltage circuit 192 (FIG. 8). This produces a pre-set voltage across resistor networks 226 and 224 which is representative of the required weight of sand of 4650 lbs. The compensating voltage for "standing column error" which causes premature cut-off of material feed, is developed across resistor 374. Thus, at this time a voltage unbalance exists in the aggregate weighing system so that the balance detector prevents further stepping operation until a new voltage balance is brought about. Also the contacts of type of aggregate selection coils 382, 384 and 386 are appropriately operated in matrix 74 (FIG. 11) to cause actuation of the discharge valve on bin number 1 which contains sand, so that sand flows into the aggregate weighing hopper 36.

In the water weighing system, (FIG. 4) when the stepping switches reach their number one positions, the relay bank 700 is prepared for energization in accordance with punched card information, and relays 736 and 738 are energized in accordance with how much water is to be delivered to the hopper at a dribble rate. In the pre-set voltage circuit of the water system (FIG. 7), a pre-set voltage will be developed across resistor combinations 730 and 732 which is proportional to 752 lbs., the required weight of water. At the same time, water will start feeding to the weighing hopper 32, since main water feed valve 762 (FIG. 11) will be opened by means of the water feed selection circuit shown in the upper right hand corner of FIG. 13.

Before operation is started, tests are made to determine the moisture content of the sand. Once this percentage is known, the movable contacts of the potentiometers 938 and 954 in the moisture compensation circuit 826 of the water system (FIG. 7), and the movable contact of potentiometer 822 in compensating circuit 824 for the aggregate system (FIG. 8), are simultaneously adjusted to positions representing this percentage. Thus, a voltage will be produced in the aggregate system that is in phase opposition to the load cell voltage, and a voltage will be produced in the water system which is in phase with the load cell voltage of that system. The magnitudes of these voltages will be determined as hereinbefore described.

Since an unbalance prevails in voltage balancing and pre-set voltage circuits 64 (FIG. 8) of the aggregate system because the load cell voltage is zero, sand will feed into the aggregate hopper 36 until the total weight in the hopper equals the weight of dry sand required plus the moisture compensation factor. In the water system, water will flow into the water hopper 32 until a voltage balance occurs, at which time the required amount of water is present in the combined contents of the water hopper and in moisture contained in the sand aggregate hopper. When the balance detector 68 (FIG. 14) of the aggregate system detects a voltage balance, it causes stepper circuit 70 to be operated. The stepper is operated through timing circuit 442 (FIG. 12), which prevents the discharge gates on the aggregate bins from being opened when stepping is taking place and introduces a time delay in the system so that the system will be completely prepared for weighing the second selected ingredient when such weighing operation is started.

It will be remembered that in the aggregate system (FIG. 8) voltage was developed across resistor 374 which caused stepping operation before the required amount of wet sand was actually in the hopper. After the feed valve is cut off, the sand that is suspended between the valve and hopper falls into the hopper so that the required weight actually reaches the hopper.

The first voltage balance that occurs in the water system is with the dribble circuit effective. This first balance causes the stepper to operate and move the switches to their number 2 position. Stepping switches 740 and 742 (FIG. 4) cause coil 736 and 738 to be rendered incapable of energization, hence the dribble voltage is removed and an unbalance voltage again occurs. Simultaneously, the water feed selection circuit 760 at the upper right hand corner of FIG. 13 causes the water valves 762 and 764 (FIG. 11) to deliver the water at a dribble rate. Water dribbles into the water hopper 32 until another voltage balance occurs. Upon sensing this, the balance detector causes stepping switches in the water system to move to their number 3 positions. At this time end of sequence relay 758 (FIG. 4) is energized.

When the aggregate system reaches a voltage balance, stepper 70 (FIG. 13) causes, through the timing circuit 442 (FIG. 12), stepping switch operation. In its number 2 position, stepping switch 356 (FIG. 5) connects relay bank 80 for energization so that the appropriate pre-set voltage will be created in pre-set voltage circuit 194 (FIG. 8). Simultaneously, the type of aggregate selection relays 364 and 366 (FIG. 5) are effective to sense information punched into the second horizontal row of the type column in the aggregate section. Accordingly the feed valve for bin number 2 is operated by means of matrix 74 and selection circuit 72 (FIG. 11). Aggregate #2 will be fed to the weighing hopper until a voltage balance occurs, whereupon the system is prepared for weighing the third selected aggregate ingredient (aggregate #5). Similarly, the fourth selected aggregate ingredient (aggregate #6) is delivered to the weighing hopper. After this, when the stepping switches are moved to their number 5 positions, the end of sequence relay 362 (FIG. 5) is energized, indicating that the aggregate weighing system has completed its operation.

At the same time the aggregate and water systems are performing their weighing operations, the cement weighing system is operative. The cement card reading relays (FIG. 6) will select the amount and types of cements, and representative voltages will be produced in the voltage balancing circuits of FIG. 9. The stepper 756 (FIG. 13) will cause all the stepping switches to reach their number one positions and connect the first pre-set voltage in circuit to produce a voltage unbalance. The cement matrix 504 (FIG. 11) will cause energization of one of the clutches 508, 510 or 512, and at the same time the motor control circuit 490 will cause the high speed motor 500 to be operative. Thus cement is delivered to the cement weighing hopper 34 (FIG. 1). At this time, the dribble voltage is effective in the circuit of FIG. 9 and when a voltage balance is reached, the balance detector causes stepper operation to remove the dribble voltage. Simultaneously, the slow feed motor 502 is energized (FIG. 11) to cause dribble feed of the cement. When the required amount of cement is in the hopper, the stepper again operates to start main feed and then dribble feed for the second selected cement. After the required amount of the second selected cement has been delivered to the weighing hopper another voltage balance occurs and the stepping switches are moved to energize end of sequence relay 592 (FIG. 6).

Thus, the weighing operation of each system is completed and the several end of sequence relays are energized. As each system completes its weighing operation, the stepping circuits will return the stepping switches to their initial positions, ready for the next operation. Energization of the end of sequence relays closes contacts 758A, 592A and 362A in the control circuit of FIG. 10 to energize coil 900, which in turn prepares discharge switch 856 for operation so that the contents of the weighing hoppers can be dumped. If the batch is to be a dry mix, diverter gate 866 (FIG. 10) is operated by wet-dry switch 868 so that the material in gathering hopper 38 (FIG. 2) will pass directly to the portable mixer. At the same time, switch 876 (FIG. 10) prepares dry mix valve 44 for discharge. Thus, when discharge switch 856 is closed, the cement and aggregate will pass into the portable mixer while the water will flow into the tank 46 of the portable mixer.

If a wet mix is desired, the wet-dry switch 868 will cause the diverter gate 866 to move to its other position, and switch 876 prepares wet-mix valve 48 for discharge operation. Before the weighing hoppers can be dumped into the gathering hopper, the stationary mixer 42 must have been operated to dump out the previous mix. This control is effected by solenoid 902 and contact 902". If the stationary mixer has been dumped, the weighing hoppers can be discharged.

If the next batching operation is to be controlled from a different card, card release button 840, in the card reader control circuit 828 of FIG. 13, is punched to cause the card to drop out of the reader. Another card can then be inserted, and card hold switch 834 pushed (FIG. 13). Start button 894 (FIG. 10) is then closed to initiate another batching operation. If all of the discharge gates on the weighing hoppers are closed and the card is properly positioned within its reader, the batcher will automatically operate.

*Manual operation*

To operate the batcher manually, automatic-numeral switch 850 is moved to its manual position causing coil 852 (FIG. 10) to energize. Simultaneously automatic-manual switches 418, 672 and 688 of FIG. 11 are operated to connect the various push buttons for operation in feeding water, aggregates and cements. It will be seen that switch 418 connects the manual controlled push buttons 420 through 430 for operation to energize discharge valves 406 through 416 of the aggregate bins. Thus, any one of the aggregates can be delivered to weighing hopper 36 by simply pushing the appropriate control switches. Similarly switch 672 enables push buttons 682, 684 and 686 to engage or disengage clutches 508, 510 and 512. Manual push buttons 910 and 912 control operation of the fast feed electric motor 500 and slow feed motor 502. This enables the operator to control the speed at which the cement is being delivered to the weighing hopper. For controlling the delivery of water to the water weighing hopper, manual push buttons 776 and 778 are provided on FIG. 13. When push button 776 is closed, relay coil 768 will be energized to close contacts 768' and energize main valve 762 (FIG. 11). Likewise closing push button 778 causes dribble feed to be effective.

In manual operation, the operator would push the button representing the first selected aggregate so that this aggregate would feed from its storage bin into weighing hopper 36. By observing dial scale 56 (FIG. 2), the operator can release the push button when the desired weight of the aggregate is in the hopper. If another aggregate is to be included in the batch, the operator pushes another control button and watches the dial scale, making allowance for the weight already in the hoppers, until feed is to be stopped by release of the button. Similarly, in the cement weighing system, push buttons are operated to feed the selected cements, first at a fast rate and then at a slower rate as the amount of cement in the hopper approaches the required amount. In the water system both main and dribble feeds are achieved with push button operation. After the aggregates, cements and water have been weighed, the weighing hoppers can be dumped, for either wet or dry mix, in exactly the same way described above in automatic operation.

From the foregoing description, it should be readily apparent that we have provided a novel and unique batch weigher which has its operation controlled from a card or by manual push button operation. Various changes and modifications may be made in this invention without departing from the scope thereof.

What we claim as the invention is:

1. In a weighing system, a weighing hopper for receiving several ingredients of non-uniform density, valve means for controlling delivery of each ingredient to said hopper, a control card having impressions thereon to represent a predetermined weight of certain selected ingredients, said card also having impressions thereon representing which of the ingredients are selected, a card reader adapted to sense the impressions on said card, and to establish voltages in accordance with the weight impressions on said card means operated from said card reader to actuate appropriate valve means and deliver the selected ingredients of non-uniform density to said hopper, and means for controlling the weights of the selected ingredients delivered to said hopper in accordance with said voltages.

2. In a weighing system, a weighing hopper for receiving several ingredients of non-uniform density, valve means for controlling delivery of each ingredient to said hopper, a control card having impressions thereon to represent predetermined weights of certain selected ingredients, said card also having impressions thereon representing which of the ingredients are selected, a card reader adapted to sense the impressions on said card, and to establish voltages in accordance with the weight impressions on said card, an ingredient selection circuit for selectively actuating said valve means, said selection circuit being operated by said card reader to actuate only the valves for said selected ingredients, and means operated from said card reader and responsive to said voltage to cause delivery of the predetermined weights of the selected ingredients of non-uniform density to said hopper.

3. In a weighing system, a weighing hopper for receiving several ingredients, valve means for controlling the delivery of each ingredient to said hopper, means for producing a first voltage representative of the weight in said hopper, circuit means for producing a pre-set voltage, a control card having impressions thereon to represent the weight of a selected ingredient and impressions thereon to determine which of the several ingredients is selected, a card reader connected to said circuit means and adapted to sense the impressions on said card for establishing the magnitude of said pre-set voltage in accordance with weight impressions on said card, and an ingredient selection circuit to actuate said valve means for said selected ingredient in accordance with the impressions on said card to select a particular ingredient, and means operated from said card reader to cause delivery of the predetermined weights of the selected ingredients to said hopper.

4. In a weighing system, a weighing hopper for receiving several ingredients, valve means for controlling the delivery of each ingredient to said hopper, means for producing a first voltage representative of the weight in said hopper, a control card having impressions thereon to represent the weight of two selected ingredients and impressions thereon to determine which of the ingredients are selected, a pre-set voltage circuit for each selected ingredient, a card reader having means to sense weight impressions and produce a pre-set voltage in each circuit said voltage having an amplitude which represents the weights of the selected ingredients, means operated from said card reader to actuate the valves for said selected ingredients, and a sequence control means first to render operative the pre-set voltage circuit for the first selected ingredient and open the valve means for the first selected ingredient and then render operative the pre-set voltage circuit for the second selected ingredient and open the valve means therefor.

5. In a batcher, a first weighing system, a second weighing system, means for delivering a plurality of ingredients to said first weighing system, means for delivering an ingredient to said second weighing system, a control card having impressions thereon to select which ingredients are to be delivered to said weighing systems and having other impressions to determine the weights of each selected ingredient, a card reader for sensing the impressions on said card, an electrical control circuit operated from said card reader for operating both of said weighing systems to weigh the ingredients designated by card impressions.

6. In a batcher, a first weighing system having a first hopper, a second weighing system having a second hopper, first means for delivering material to said first hopper, second means for delivering material to said second hopper, a card reader connected to said first and said second weighing systems for sensing impressions on a control card which has impressions thereon representing selected weights of the materials to be weighed, a first electrical circuit in said first system for producing a voltage whose amplitude is representative of the selected weight of material to be weighed by said first system, a second electrical circuit in said second system for producing a voltage whose amplitude is representative of the selected weight of material to be weighed by said second system, first circuit means operated from said first electrical circuit to operate said first material delivery means and deliver material to said first hopper until the selected weight of material is in said first hopper, and second circuit means operated from said second electrical circuit to operate said second delivery means and deliver material to said second hopper until the selected weight of material is in said second hopper.

7. In a batcher, a first electrical weighing system, means for producing a voltage in said first system representative of a selected weight of material, a second weighing system, means for producing a voltage in said second system representative of a selected weight of another material, and compensating circuit means having elements in each of said systems, said elements being conjointly operable to reduce one of said voltages and proportionately increase the other of said voltages to modify the actual weights of materials weighed in the systems.

8. In a batcher, a first electrical weighing system, means for producing a voltage in said first system representative of a selected weight of material, a second weighing system, means for producing a voltage in said second system representative of a selected weight of another material, and compensating circuit means to reduce one of said voltages and proportionately increase the other of said voltages to modify the actual weights of materials weighed in the systems, said compensating circuit means comprising impedance elements in each weighing system having a common control member for adjusting the effective impedance values of said impedance elements.

9. In a batcher, a first electrical weighing system for weighing an ingredient having a moisture content, means for producing a voltage in said first system representative of a selected dry weight of said ingredient, a second weighing system for weighing water, means for producing a voltage in said second system representative of the total weight of water required in the batch, and compensating means having elements in each of said systems, said elements being conjointly operable to increase said voltage in said first system and proportionately reduce said voltage in said water weighing system in accordance with the percent moisture content of said ingredient.

10. In a batcher, a first electrical weighing system for weighing an ingredient having a moisture content, means for producing a voltage in said first system representative of a selected dry weight of said ingredient, a second weighing system for weighing water, means for producing a voltage in said second system representative of the total weight of water required in the batch, compensating means in each of said systems to increase said voltage in said first system and proportionately reduce said voltage in said water weighing system in accordance with the percent moisture content of said ingredient, and a control member for said compensating means to conjointly adjust said voltages in accordance with control member operation.

11. In a batcher, a first electrical weighing system for weighing an ingredient having a moisture content, means for producing a voltage in said first system representative of a selected dry weight of said ingredient, a second weighing system for weighing water, means for producing a voltage in said second system representative of the total weight of water required in the batch, and compensating means to increase said voltage in said first system and proportionately reduce said voltage in said water weighing system in accordance with the percent moisture content of said ingredient, said compensating means comprising a potentiometer in said ingredient weighing system and a potentiometer in said water weighing system with a common adjustable control member.

12. In a batcher, a first electrical weighing system, means for producing a voltage in said first system representative of a selected weight of material, a second weighing system, means for producing a voltage in said second system representative of a selected weight of another material, compensating circuit means having elements in each of said systems, said elements being conjointly operable to reduce one of said voltages and proportionately increase the other of said voltages to modify the actual weights of materials weighed in the systems, and means to prevent said first weighing system from completing its weighing operation until the second weighing system has completed its weighing operation.

13. In a batcher, a first electrical weighing system for weighing an ingredient having a moisture content, means for producing a voltage in said first system representative of a selected dry weight of said ingredient, a second weighing system for weighing water, means for producing a voltage in said second system representative of the total weight of water required in the batch, compensating means having elements in each of said systems, said elements being conjointly operable to increase said voltage in said first system and proportionately reduce said voltage in said water weighing system in accordance with the percent moisture content of said ingredient and circuit means to hold up weighing operation of said water weighing system until said ingredient weighing system has completed its weighing operation.

14. In a weighing system, a weighing hopper for receiving ingredients, valve means for controlling delivery of said ingredients to said hopper, a control card having impressions thereon to represent predetermined weights of said ingredients, a card reader adapted to sense impressions on said cards, control means operated from said card reader to actuate said valve means and deliver the predetermined weights to said hopper, a mechanical scale system associated with said hopper, and manual means for operating said valves independently of said card reader operation.

15. In weighing system, a weighing hopper for receiving ingredients, valve means for controlling delivery of said ingredients to said hopper, a control card having impressions thereon to represent predetermined weights of said ingredients, a card reader adapted to sense impressions on said card, control means operated from said card reader to actuate said valve means and deliver the predetermined weights to said hopper, a mechanical scale system associated with said hopper, manual means for operating said valves independently of card reader operation, and switch means for selectively rendering said manual means and control means operative.

16. In a batcher, a hopper, an electrical weighing system for weighing material in said hopper, a mechanical weighing system for weighing material in said hopper, a control card having impressions thereon to select the weight of material and the types of materials to be batched, a motor operated valve for delivering each material to said hopper, a selector circuit for operating said valves, a card reader for actuating said selector circuit and electrical weighing system to automatically deliver the selected weights of the selected materials to said hopper, said selector circuit including manual means having a plurality of switches, each switch being associated with a particular one of said motor operated valves to deliver materials to said hopper in amounts indicated on said mechanical weighing system.

17. In a batcher, a hopper, an electrical weighing system for weighing material in said hopper, a mechanical weighing system for weighing material in said hopper, a control card having impressions thereon to select the weight of material and the types of materials to be batched, a motor operated valve for delivering each material to said hopper, a selector circuit for operating said valves, a card reader for actuating said selector circuit and electrical weighing system to automatically deliver the selected weights of the selected materials to said hopper, said selector circuit including manual means having a plurality of manually operated switches, each connected in series with an associated one of said valves to deliver materials to said hopper in amounts indicated on said mechanical weighing system, and switch means selectively to render said manual means or said card reader inoperative.

18. In an electrical weighing system, a hopper, valve means for delivering material to said hopper, means for producing a voltage representative of the weight of material in said hopper, means for producing a second voltage of a preselected value, said preselected value of said second voltage being proportioned to the value of said first voltage produced by a predetermined weight of material in said hopper, electrical means to sense the values of said voltages and deliver material to said hopper until said predetermined weight of material is received in said hopper, an overload detector to render the weighing system inoperative in the event the weight of material in said hopper exceeds said predetermined weight, said valve means comprising a dribble valve for providing a slow feed of material to the hopper and a main valve for providing fast feed of material, means for first rendering said main valve effective and then said dribble valve, and means to make said overload detector inoperative during fast feed operation.

19. A cumulative material weighing apparatus comprising means for detecting data on an information media which data indicates types and quantities of material to be successively accumulated, a common material collection and weight indicating means, plural means for delivery of selected ones of said materials to said collection and weight indicating means, a transducer operable by said collection and indicating means which produces an electrical output indicative of cumulative weight, an electrical register responsive to said means for detecting data for accumulating a running total representative of an individual material to be weighed plus already accumulated material, means for comparing said electrical output of said transducer and said register, means responsive to said comparison for successively signaling said plural means for delivery to change the type of material being delivered, and means for pre-setting said register in accordance with predetermined water content of individual materials.

20. A cumulative material weighing apparatus comprising means for detecting data on an information media which data indicates types and quantities of material to be successively accumulated, a common material collection and weight indicating means, plural means for delivery of selected ones of said materials to said collection and weight indicating means, a transducer operable by said collection and indicating means which produces an electrical output indicative of cumulative weight, an electrical register responsive to said means for detecting data for accumulating a running total representative of an individual material to be weighed plus already accumulated material, means for comparing said electrical output of said transducer and said register, means responsive to said comparison for successively signaling said plural means for delivery to change the type of material being delivered, wherein delivered water is one of the materials of the cumulative mixture to be achieved, and means for subtracting the water content of said individual materials from said delivered water.

References Cited in the file of this patent

UNITED STATES PATENTS

| | | |
|---|---|---|
| 2,109,534 | Johnson | Mar. 1, 1938 |
| 2,199,010 | Robb | Apr. 30, 1940 |
| 2,336,130 | Saxe | Dec. 7, 1943 |
| 2,431,058 | Manning | Nov. 18, 1947 |
| 2,503,295 | Palmer | Apr. 11, 1950 |
| 2,559,307 | Martinson | July 3, 1951 |
| 2,650,057 | Goland et al. | Aug. 25, 1953 |
| 2,650,790 | Carliss | Sept. 1, 1953 |
| 2,656,109 | Lindars | Oct. 20, 1953 |
| 2,678,206 | Muldoon et al. | May 11, 1954 |
| 2,738,673 | Campani | Mar. 20, 1956 |
| 2,750,144 | Beckwith | June 12, 1956 |
| 2,760,232 | Rougemont et al. | Aug. 28, 1956 |
| 2,767,584 | Franzel | Oct. 23, 1956 |
| 2,801,819 | Lindars | Aug. 6, 1957 |

UNITED STATES PATENT OFFICE
CERTIFICATE OF CORRECTION

Patent No. 3,173,505                                                  March 16, 1965

Matthew T. Thorsson et al.

It is hereby certified that error appears in the above numbered patent requiring correction and that the said Letters Patent should read as corrected below.

Column 2, line 36, for "numeral" read -- numerical --; line 51, for "thre" read -- three --; line 53, for "arrangement" read -- arrangements --; column 4, line 73, for "understood" read -- understand --; column 5, line 38, for "36" read -- 66 --; line 48, for "bath" read -- batch --; same column 5, line 68, for "volt-" read -- voltage --; column 7, line 35, for "bath" read -- batch --; line 48, after "1", second occurrence, insert -- is --; same column 7, line 57, for "tne" read -- the --; column 9, line 48, for "236" read -- 226 --; line 70, for "bineary" read -- binary --; column 10, lines 32 and 50, for "224", each occurrence, read -- 244 --; line 51, for "the" read -- this --; column 11, line 16, strike out "the", second occurrence; line 74, for "engaeg" read -- engage --; column 17, line 26, for "indicate" read -- indicated --; column 22, line 47, for "in" read -- is --; column 27, line 10, for "784" read -- 874 --; column 28, line 16, for "224" read -- 244 --; column 29, line 26, for "the" read -- an --; column 30, line 18, for "902″" read -- 902′ --; line 32, for "automatic-numeral" read -- automatic-manual --; column 33, line 29, for "the" read -- said --.

Signed and sealed this 21st day of September 1965.

(SEAL)
Attest:

ERNEST W. SWIDER                                                      EDWARD J. BRENNER
Attesting Officer                                                   Commissioner of Patents